(12) United States Patent
Inoue et al.

(10) Patent No.: US 11,192,559 B2
(45) Date of Patent: Dec. 7, 2021

(54) DRIVING ASSISTANCE SYSTEM

(71) Applicants: TOYOTA JIDOSHA KABUSHIKI KAISHA, Toyota (JP); National University Corporation Tokyo University of Agriculture and Technology, Fuchu (JP)

(72) Inventors: Shintaro Inoue, Naka-gun (JP); Pongsathorn Raksincharoensak, Fuchu (JP)

(73) Assignees: TOYOTA JIDOSHA KABUSHIKI KAISHA, Toyota (JP); National University Corporation Tokyo University of Agriculture and Technology, Fuchu (JP)

( * ) Notice: Subject to any disclaimer, the term of this patent is extended or adjusted under 35 U.S.C. 154(b) by 240 days.

(21) Appl. No.: 16/443,117

(22) Filed: Jun. 17, 2019

(65) Prior Publication Data

US 2020/0017111 A1  Jan. 16, 2020

(30) Foreign Application Priority Data

Jul. 11, 2018 (JP) .............................. JP2018-131723

(51) Int. Cl.
*B60W 40/09* (2012.01)
*B60W 10/20* (2006.01)
(Continued)

(52) U.S. Cl.
CPC ............ *B60W 40/09* (2013.01); *B60W 10/20* (2013.01); *B62D 6/10* (2013.01); *B62D 15/021* (2013.01);
(Continued)

(58) Field of Classification Search
CPC .. B60W 40/09; B60W 10/20; B60W 2420/42; B60W 2040/0818;
(Continued)

(56) References Cited

U.S. PATENT DOCUMENTS 10,351,168 B2 * 7/2019 Tsubaki ............... B62D 5/0463

FOREIGN PATENT DOCUMENTS

JP  2011-005893 A  1/2011
JP  2011057037 A  3/2011
(Continued)

*Primary Examiner* — Brian P Sweeney
(74) *Attorney, Agent, or Firm* — Sughrue Mion, PLLC

(57) ABSTRACT

A driving assistance system includes a driving readiness degree estimation unit configured to estimate a driving readiness degree relating to a driving consciousness of the driver based on the travel state of the vehicle or the driving operation of the vehicle by the driver and the traveling environment of the vehicle, a proportional gain calculation unit configured to calculate a proportional gain based on the driving readiness degree and the speed of the vehicle, and an assistance torque calculation unit configured to calculate the assistance torque according to a value obtained by multiplying a difference between the target steering angle and the actual steering angle by the proportional gain. If the speed is constant, the proportional gain calculation unit is configured to calculate the proportional gain as a smaller value as the driving readiness degree becomes lower.

4 Claims, 12 Drawing Sheets

(51) Int. Cl.
 B62D 15/02 (2006.01)
 B62D 6/10 (2006.01)
 B60W 40/08 (2012.01)
(52) U.S. Cl.
 CPC . *B60W 2040/0818* (2013.01); *B60W 2420/42* (2013.01); *B60W 2420/52* (2013.01); *B60Y 2400/303* (2013.01)
(58) Field of Classification Search
 CPC .......... B60W 2420/52; B60W 2710/20; B62D 15/021; B62D 6/10; B62D 15/0265; B62D 15/025; B62D 6/00; B60Y 2400/303
 See application file for complete search history.

(56) References Cited

FOREIGN PATENT DOCUMENTS

| | | |
|---|---|---|
| JP | 2011073530 A | 4/2011 |
| JP | 2017202772 A | 11/2017 |
| JP | 2018034592 A | 3/2018 |

* cited by examiner

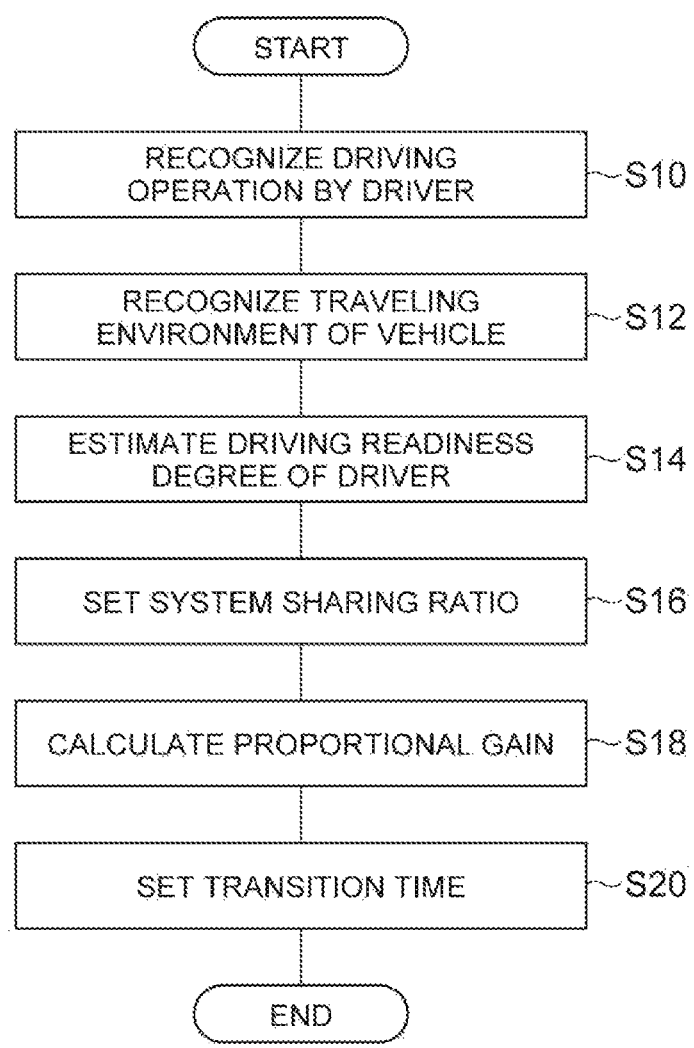

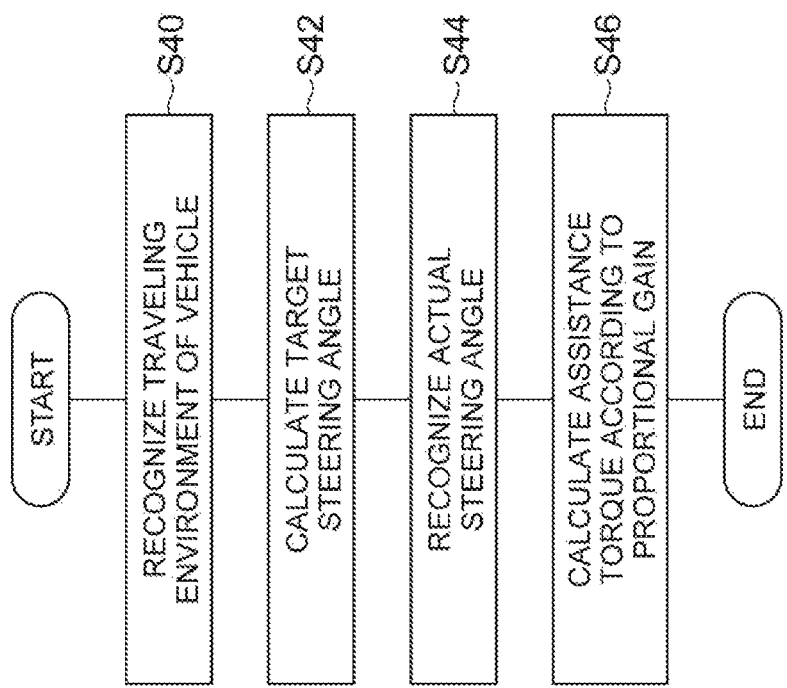
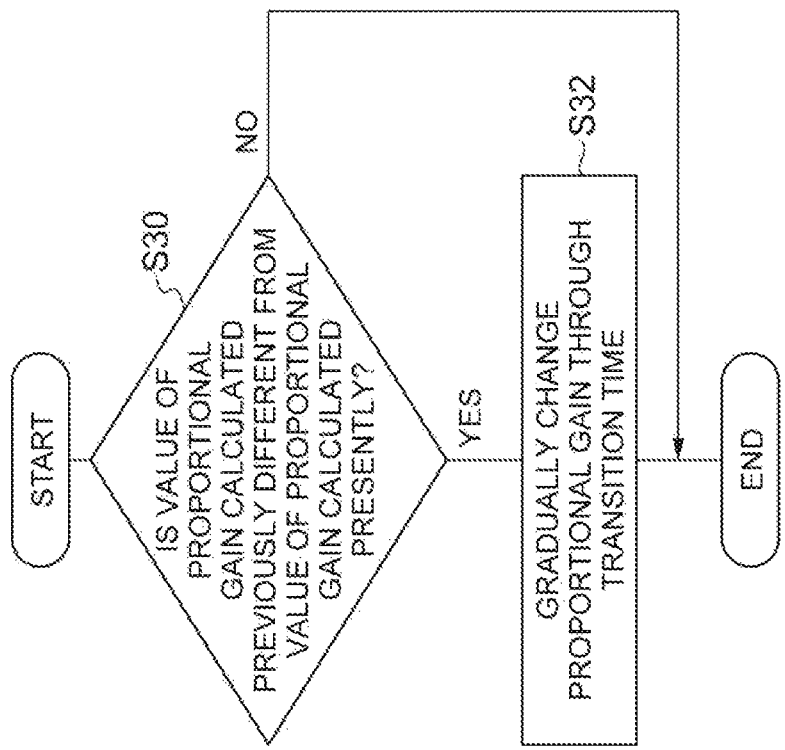

DRIVING ASSISTANCE SYSTEM

TECHNICAL FIELD

The present disclosure relates to a driving assistance system.

CROSS-REFERENCE TO RELATED APPLICATION

This application claims the benefit of priority from Japanese Patent Application No. 2018-131723, filed Jul. 11, 2018, the entire contents of which are incorporated herein by reference.

BACKGROUND

In the related art, Japanese Unexamined Patent Application Publication No. 2011-57037 is known as a technical literature relating to a driving assistance system. In this publication, a steering assistance control device is disclosed, which calculates a steering control amount such that a vehicle travels on a target traveling route, and sets a control gain according to a driving consciousness of the driver detected from a hand-release state of a steering wheel by the driver or a wobble of the vehicle, and then, calculates the steering control amount from the target traveling route and the control gain.

SUMMARY

Incidentally, in the device in the related art described above, if the driving consciousness of the driver does not decrease such an amount as the driver's hand-release of the steering wheel occurs or the wobble of the vehicle and the like occurs, the setting of the control gain will not be changed. However, it is considered that the state of the driver is likely to suddenly change to a state that causes the sudden wobble of the vehicle. In other words, in the state of the driver in many cases, it can be considered that the driving consciousness decreases step by step from a usual state. Therefore, it is desirable to provide a driving assistance system that can appropriately estimate the state of the driver and perform the driving assistance.

A driving assistance system according to an aspect of the present disclosure is configured to calculate a target steering angle based on a traveling environment of a vehicle and confer an assistance to a steering section, torque according to a difference between the target steering angle and an actual steering angle of the vehicle so that the actual steering angle of the vehicle approaches the target steering angle. The system is configured to include: a travel state recognition unit configured to recognize a travel state including a speed of the vehicle; a driving operation recognition unit configured to recognize a driving operation of the vehicle by a driver, a traveling environment recognition unit configured to recognize a traveling environment of the vehicle; a driving readiness degree estimation unit configured to estimate a driving readiness degree relating to a driving consciousness of the driver based on the travel state of the vehicle or the driving operation of the vehicle by the driver and the traveling environment of the vehicle; a proportional gain calculation unit configured to calculate a proportional gain based on the driving readiness degree and the speed of the vehicle; and an assistance torque calculation unit configured to calculate the assistance torque according to a value obtained by multiplying a difference between the target steering angle and the actual steering angle by the proportional gain. If the speed is constant, the proportional gain calculation unit is configured to calculate the proportional gain as a smaller value as the driving readiness degree becomes lower.

According to the aspect of the present disclosure, since the driving readiness degree relating to the driving consciousness of the driver is estimated based on the travel state of the vehicle or the driving operation by the driver of the vehicle and the traveling environment of the vehicle, it is possible to appropriately estimate the driving readiness degree of the driver from the travel state of the vehicle according to the traveling environment or the driving operation by the driver according to the traveling environment compared to a case where the driving readiness degree is estimated only from the travel state of vehicle or only from the driving operation by the driver. In addition, in the driving assistance system, when the speed is constant, the proportional gain is calculated as a smaller value as the driving readiness degree becomes lower, and the assistance torque is calculated according to the value obtained by multiplying the difference between target steering angle and actual steering angle by the proportional gain. Therefore, it is possible to perform the driving assistance by the assistance torque using the appropriately estimated driving readiness degree. Therefore, according to the driving assistance system, it is possible to appropriately estimate the state of the driver and to perform the driving assistance according to the state of the driver.

The driving assistance system described above may further include transition time setting unit configured to set a transition time based on the driving readiness degree. If a value of the proportional gain calculated previously (in the previous time) is different from a value of the proportional gain calculated presently (in the current time), the proportional gain calculation unit may be configured to change the proportional gain so as to gradually reach the value of the proportional gain calculated presently from the value of the proportional gain calculated previously through the transition time. The transition time setting unit may be configured to set the transition time as a shorter time as the driving readiness degree becomes lower.

The driving assistance system described above may further include a differential gain calculation unit configured to calculate a differential gain based on the driving readiness degree and the proportional gain. The assistance torque calculation unit may be configured to calculate the assistance torque according to a total value obtained by adding a value obtained by multiplying a difference between the target steering angle and the actual steering angle by the proportional gain, to a value obtained by multiplying a difference between a differential value of the target steering angle and a differential value of the actual steering angle by the differential gain. The differential gain calculation unit may be configured to calculate the differential gain as a smaller value as the driving readiness degree becomes lower.

According to the aspect of the present disclosure, it is possible to appropriately estimate the state of the driver and to perform the driving assistance according to the state of the driver.

BRIEF DESCRIPTION OF THE DRAWINGS

FIG. 7 is a flowchart illustrating an example of proportional gain calculation processing.

FIG. 8A is a flowchart illustrating an example of proportional gain change processing.

FIG. 8B is a flowchart illustrating an example of assistance torque calculation processing.

DETAILED DESCRIPTION

Hereinafter, embodiments of the present disclosure will be described with reference to the drawings.

First Embodiment

Figure 1:
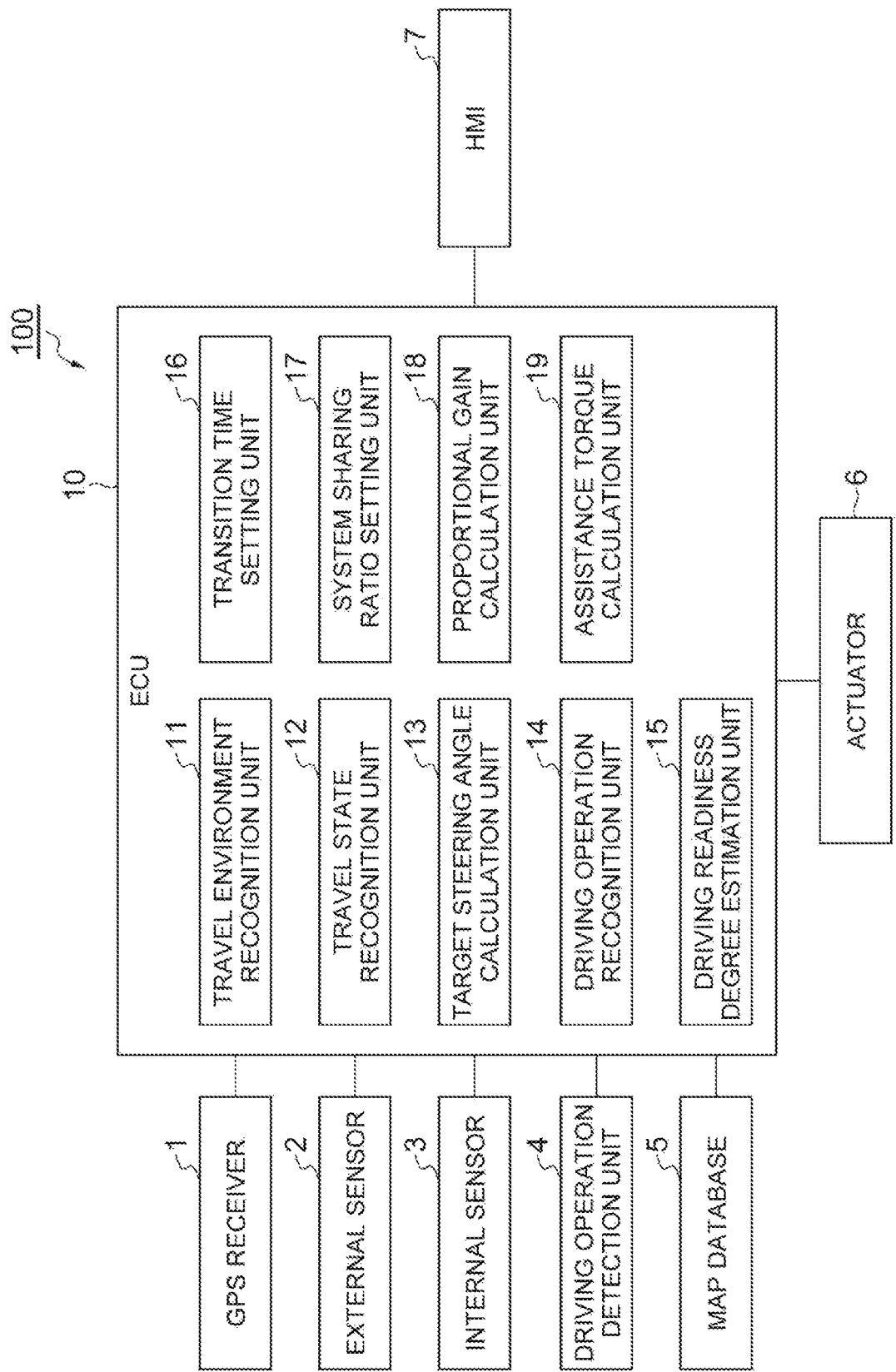
FIG. 1 is a block diagram illustrating a driving assistance system in a first embodiment.

FIG. 1 is a block diagram illustrating a driving assistance system in a first embodiment.
A driving assistance system 100 illustrated in FIG. 1 is a system that performs driving assistance to assist the driving of a vehicle by the driver such as passenger cars.

The driving assistance system 100 calculates a target steering angle of the vehicle from a traveling environment or the like of the vehicle and performs a driving assistance by giving an assistance torque to a steering section of the vehicle such that an actual steering angle of the vehicle approaches the target steering angle.

Configuration of Driving Assistance System

As illustrated in FIG. 1, the driving assistance system 100 in the first the first embodiment includes an electronic control unit (ECU) 10 that performs an overall management of the system. The ECU 10 is an electronic control unit including a central processing unit (CPU), read only memory (ROM), random access memory (RAM) and the like. In the ECU 10, for example, various functions are realized by loading a program stored in the ROM into the RAM and executing the program loaded in the RAM by the CPU. The ECU 10 may be configured with a plurality of electronic control units.

The ECU 10 is connected to a GPS receiver 1, an external sensor 2, an internal sensor 3, a driving operation detection unit 4, a map database 5, an actuator 6, and a human machine interface (HMI) 7.

The GPS receiver 1 measures a position of the vehicle (for example, latitude and longitude of the vehicle) by receiving signals from three or more GPS satellites. The GPS receiver 1 transmits information on the measured position of the vehicle to the ECU 10.

The external sensor 2 is a detection device that detects a surrounding situation of the vehicle. The external sensor 2 includes at least one of a camera and a radar sensor.

The camera is an imaging device that images the external situation of the vehicle. The camera is provided on the inside of a windshield of the vehicle and images the front of the vehicle. The camera transmits image information relating to external situation of the vehicle to the ECU 10. The camera may be a monocular camera or may be a stereo camera.

The radar sensor is a detection device that detects obstacles around the vehicle using radio waves (for example, millimeter waves) or light. The radar sensor includes, for example, millimeter wave radar or a light detection and ranging (LIDAR). The radar sensor transmits the radio wave or light to the surroundings of the vehicle, and detects the obstacles by receiving radio waves or light reflected from obstacles. The radar sensor transmits the detected obstacle information to the ECU 10. The obstacles include fixed objects such as guardrails and buildings, and moving obstacles such as pedestrians, bicycles, other vehicles, and the like.

The internal sensor 3 is a detection device that detects a travel state of the vehicle. The internal sensor 3 includes a vehicle speed sensor, an accelerator sensor, and a yaw rate sensor. The vehicle speed sensor is a measurement device that measures a speed of the vehicle. As a vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measurement device that measures an acceleration of the vehicle. The accelerator sensor includes, for example, a longitudinal accelerator sensor that measures acceleration in the longitudinal direction of the vehicle and a lateral accelerator sensor that measures a lateral acceleration of the vehicle. The accelerator sensor transmits, for example, acceleration information of the vehicle to the ECU 10. The yaw rate sensor is a measurement device that measures a yaw rate (rotation angular velocity) around the vertical axis at the center of gravity of the vehicle. As a yaw rate sensor, for example, a Gyro sensor can be used. The yaw rate sensor transmits the measured yaw rate information of the vehicle to the ECU 10.

The driving operation detection unit 4 detects an operation of the operation section of the vehicle by the driver. The driving operation detection unit 4 includes, for example, a steering sensor, an accelerator sensor, and a brake sensor. The operation section of the vehicle is a device to which a driver inputs an operation for driving the vehicle. The operation section of the vehicle includes at least one of a steering section of the vehicle, an accelerator operation section of the vehicle, and a brake operation section of the vehicle. The steering section is, for example, a steering wheel. The steering section is not limited to a case of wheel-shape but may be any configuration as long as it functions as a steering wheel. The accelerator operation section is, for example, an accelerator pedal. The brake operation section is, for example, a brake pedal. The accelerator operation section and the brake operation section do not necessarily need to be pedals, and any configuration may be used as long as the driver can input the acceleration or deceleration.

The steering sensor measures an operation amount of the steering section by the driver. The operation amount of the steering section includes a steering angle. The operation amount of the steering section may include a steering torque. The accelerator sensor measures an operation amount of the accelerator operation section by the driver. The operation amount of the accelerator operation section includes, for example, a pressing amount of the accelerator pedal. The brake sensor detects an operation amount of the brake operation section by the driver. The operation amount of the brake operation section includes, for example, a pressing amount of the brake pedal. The accelerator operation section and the brake operation section may include a pressing speed. The driving operation detection unit 4 transmits the operation amount information relating to the measured operation amount by the driver to the ECU 10.

The map database 5 is a database storing map information. The map database 5 is formed, for example, in a hard disk drive (HDD) mounted on the vehicle. The map information includes information on the position of the road, information on the shape of the road (for example, types of curves or straight roads, a curvature of the curve, or the like), information on the position of the intersection and the branch, and information on the position of a building. The map information may include gradient information of the road. The map database 5 may be formed in a server that can communicate with the vehicle.

The actuator 6 is a device used for controlling the vehicle. The actuator 6 includes at least a drive actuator, a brake actuator, and a steering actuator. The drive actuator controls a driving force of the vehicle by controlling an amount of air (throttle opening degree) supplied to the engine according to a control signal from the ECU 10. If the vehicle is a hybrid vehicle, in addition to the amount of air supplied to the engine, the control signal from the ECU 10 is input to a motor as a power source, and then, the driving force is controlled. If the vehicle is an electric vehicle, the control signal from the ECU 10 is input to a motor as a power source, and then, the driving force of the vehicle V is controlled. The motor as the power source in these cases configures the actuator 6.

The brake actuator controls the brake system according to a control signal from the ECU 10 and controls a braking force applied to the wheels of the vehicle. For example, a hydraulic brake system can be used as the brake system. The steering actuator controls the driving of an assist motor controlling a steering torque of an electric power steering system according to a control signal from the ECU 10. In this way, the steering actuator controls the steering torque of the vehicle.

The human machine interface (HMI) 7 is an interface that performs inputting and outputting of the information between the driving assistance system 100 and the driver. The HMI 7 includes, for example, a display, a speaker, and the like. The display may be a head up display (HUD) that projects and displays an image on the windshield of the vehicle. The HMI 7 outputs an image on the display and outputs a voice from the speaker according to a control signal from the ECU 10.

Next, a functional configuration of the ECU 10 will be described. The ECU 10 includes a traveling environment recognition unit 11, a travel state recognition unit 12, a target steering angle calculation unit 13, a driving operation recognition unit 14, a driving readiness degree estimation unit 15, a transition time setting unit 16, a system shared ratio setting unit 17, a proportional gain calculation unit 18, and an assistance torque calculation unit 19.

The traveling environment recognition unit 11 recognizes a traveling environment outside the vehicle based on a result of detection performed by the external sensor 2. The traveling environment includes a situation of a traveling lane in which the vehicle travels and a situation of the obstacles around the vehicle. The situation of the traveling lane includes at least a curvature of the traveling lane and a relative position between the lane marking lines of the traveling lane and the vehicle. The situation of the traveling lane may include a gradient of the traveling lane or elevation of the traveling lane. The traveling environment recognition unit 11 recognizes the situation of the traveling lane by recognizing the lane marking lines from at least one of the image captured by the camera and the obstacle information from the radar sensor. The traveling environment recognition unit 11 may recognize the situation of the traveling lane using the information on the position of the vehicle measured by the GPS receiver 1 and the map information in the map database 5 in addition to the result of detection performed by the external sensor 2.

The traveling environment recognition unit 11 recognizes the situation of the obstacle from at least one of the image captured by the camera and the obstacle information from the radar sensor. The situation of the obstacle includes a position of the obstacle with respect to the vehicle, a relative speed of the obstacle with respect to the vehicle, and a movement direction of the obstacle with respect to the vehicle. The situation of the obstacle may include distinction between a fixed obstacle and a moving obstacle, and may include a type of obstacle (pedestrian, automobile, motorcycle, and the like).

The travel state recognition unit 12 recognizes a travel state of the vehicle based on the result of detection performed by the internal sensor 3. The travel state includes the speed of the vehicle, the acceleration of the vehicle, and the yaw rate of the vehicle. Specifically, the travel state recognition unit 12 recognizes the speed of the vehicle based on the speed information from the speed sensor. The travel state recognition unit 12 recognizes the acceleration of the vehicle based on the vehicle acceleration information from the accelerator sensor. The travel state recognition unit 12 recognizes the orientation of the vehicle based on the yaw rate information from the yaw rate sensor.

The travel state recognition unit 12 recognizes the actual steering angle of the vehicle as the travel state of the vehicle. The travel state recognition unit 12 can recognize the actual steering angle of the vehicle based on the result of detection performed by the steering sensor that configures the driving operation detection unit 4.

The target steering angle calculation unit 13 calculates the target steering angle of the vehicle based on the traveling environment of the vehicle recognized by the traveling environment recognition unit 11. The target steering angle of the vehicle is the steering angle of the vehicle which is a target of driving assistance. For example, if an obstacle does not exist around the vehicle, the target steering angle calculation unit 13 calculates the target steering angle of the vehicle such that the vehicle travels on a center of the traveling lane of the vehicle (a center in the lane width direction).

The target steering angle calculation unit 13 may calculate the target steering angle of the vehicle based on the travel state of the vehicle recognized by the travel state recognition unit 12 in addition to the traveling environment of the vehicle. In there exists a parked vehicle positioned at the front of the vehicle, which protrudes to the driving lane from the shoulder of the road, the target steering angle calculation unit 13 calculates the target steering angle such that the vehicle travels along the side of the parked vehicle while keeping a certain distance from the parked vehicle. The target steering angle calculation unit 13 may calculate the target steering angle of the vehicle using other well-known methods.

The driving operation recognition unit 14 recognizes the driver's driving operation detected by the driving operation detection unit 4. The driving operation includes an operation of the accelerator operation section by the driver, an operation of the brake operation section by the driver, and an operation of the steering section by the driver. The driving operation may include an ON timing of the accelerator pedal and the brake pedal, and an OFF timing of the accelerator pedal and the brake pedal. An ON state of the accelerator pedal means, for example, a state in which the driver has pressed the accelerator pedal equal to or higher than a certain level. An OFF state of the accelerator pedal means, for example, a state in which the driver has stopped pressing the accelerator pedal. The same applies to the brake pedal.

The driving readiness degree estimation unit 15 estimates a driving readiness degree P relating to the driving consciousness of the driver. The driving readiness degree P is a degree according to the height of driving consciousness of the driver, which means the degree of readiness of the driver to the traveling environment outside of the vehicle. The higher the degree of readiness of the driver and the driving consciousness to the traveling environment of the vehicle, the higher the value of the driving readiness degree P.

The driving readiness degree estimation unit 15 estimates the driving readiness degree P based on the driver's driving operation recognized by the driving operation recognition unit 14 and the traveling environment of the vehicle recognized by the traveling environment recognition unit 11. For example, if the vehicle is approaching an obstacle ahead as the traveling environment of the vehicle, the driving readiness degree estimation unit 15 estimates the driving readiness degree P based on the timing at which the driver turns off the accelerator pedal.

If the driving consciousness is high and the driver is ready for the traveling environment of the vehicle, it can be considered that the driver promptly takes a posture to turn off the accelerator pedal to reduce the speed when the vehicle approaches the obstacle in front of the vehicle. On the other hand, if the driving consciousness of the driver is low and the driver is not ready for the changes in the traveling environment of the vehicle, it can be considered that the timing for the driver to turn off the accelerator pedal is delayed. Therefore, if the traveling environment is in a state in which the vehicle is approaching the obstacles ahead, the driving readiness degree estimation unit 15 estimates the driving readiness degree P from the timing at which the driver turns off the accelerator pedal.

Figure 2A:
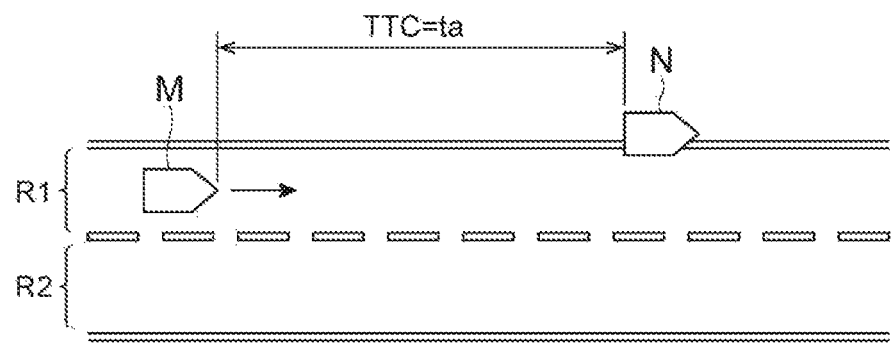
FIG. 2A is a plan view illustrating a scene in which a vehicle is approaching a parked vehicle ahead.

Here, FIG. 2A is a plan view illustrating a scene in which a vehicle is approaching a parked vehicle ahead. In FIG. 2A, a vehicle M subject to the driving assistance, a parked vehicle N, a traveling lane R1 for the vehicle M, an adjacent lane R2 that is adjacent to the traveling lane R1 are illustrated. In FIG. 2A, the case where the vehicle M is approaching the parked vehicle (obstacle) N ahead is illustrated as the traveling environment of the vehicle M. It is assumed that the time to collision between the vehicle M and the parked vehicle N in FIG. 2A is $t_a$. The driving readiness degree estimation unit 15 recognizes that the traveling environment of the vehicle M is in a state of approaching the parked vehicle N ahead based on the traveling environment of the vehicle recognized by the traveling environment recognition unit 11.

Figure 2B:
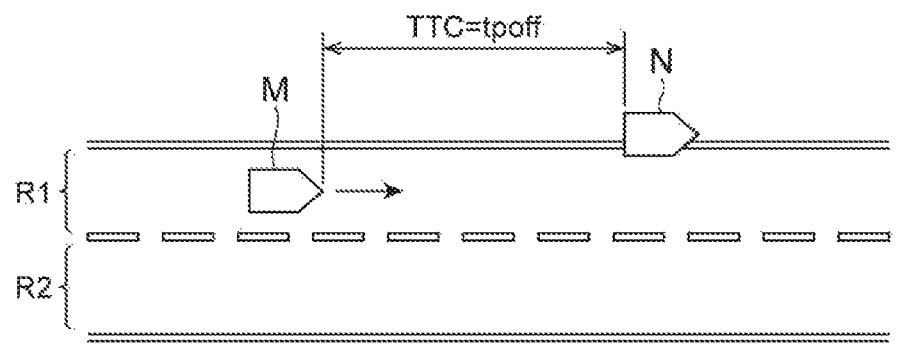
FIG. 2B is a plan view illustrating a scene in which a driver of the vehicle approaching the parked vehicle turns off the accelerator pedal.

FIG. 2B is a plan view illustrating a scene in which the driver of the vehicle M approaching the parked vehicle N turns off the accelerator pedal. In FIG. 2B, it is assumed that the time to collision between vehicle M and the parked vehicle N when the driver turns off the accelerator pedal is $t_{poff}$. The driving readiness degree estimation unit 15 recognizes the timing at which the driver turns off the accelerator pedal using, for example, the time to collision (TTC) between the vehicle M and the parked vehicle N.

Specifically, if it is recognized that the traveling environment of vehicle M is in a state of approaching the parked vehicle N ahead, the driving readiness degree estimation unit 15 recognizes that the driver turns off the accelerator pedal based on the driving operation by the driver recognized by the driving operation recognition unit 14. The driving readiness degree estimation unit 15 recognizes the time to collision $t_{poff}$ when the driver turns off the accelerator pedal using a relative speed and a relative position between the vehicle M and the parked vehicle N, based on the traveling environment of vehicle M recognized by the traveling environment recognition unit 11. The driving readiness degree estimation unit 15 recognizes the time to collision $t_{poff}$ as the timing at which the driver turns off the accelerator pedal.

As an example, the driving readiness degree estimation unit 15 estimates the driving readiness degree P using the time to collision tpoff by using table data in which the time to collision $t_{poff}$ and the driving readiness degree P are in associated with each other in advance. The table data is stored in the ROM of the ECU 10, for example.

Figure 3A:
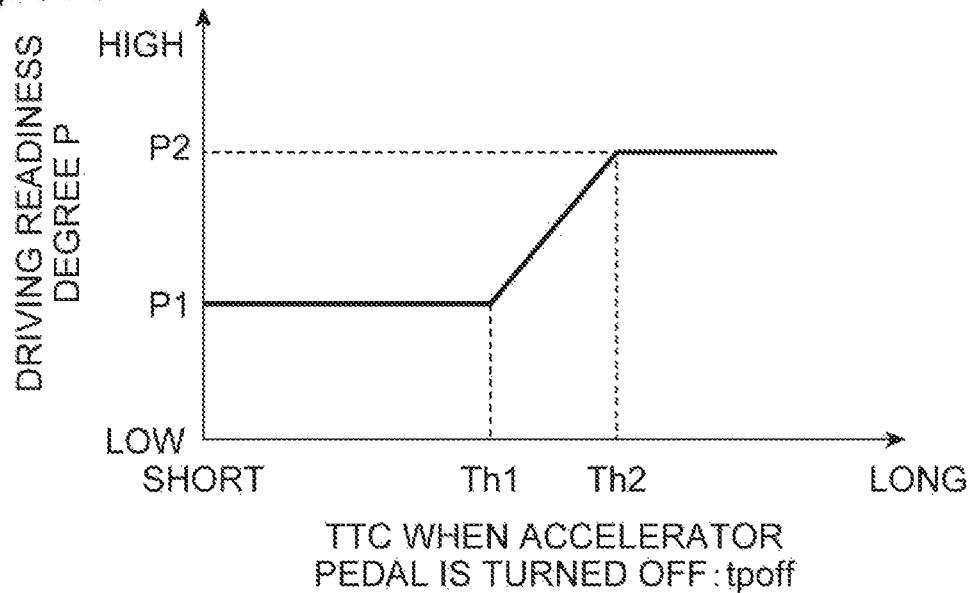
FIG. 3A is a graph illustrating an example of an association between a time to collision (ITC) and a driving readiness degree when the driver turns off the accelerator pedal.

Here, FIG. 3A is a graph illustrating an example of an association between the time to collision $t_{poff}$ and the driving readiness degree P when the driver turns off the accelerator pedal. The vertical axis in FIG. 3A represents the driving readiness degree P, and the horizontal axis represents the time to collision when the accelerator pedal is turned off.

In FIG. 3A, a driving readiness degree value P1 when the time to collision $t_{poff}$ is equal to a first time threshold value Th1 and a driving readiness degree value P2 when the time to collision $t_{poff}$ is equal to a second time threshold value Th2 are illustrated. The first time threshold value Th1 and the second time threshold value Th2 are preset threshold values set in advance. The first time threshold value Th1 is smaller than the second time threshold value Th2. The driving readiness degree value P1 is smaller than the driving readiness degree value P2.

The driving readiness degree estimation unit 15 estimates the driving readiness degree P from the time to collision $t_{poff}$ using the table data corresponding to FIG. 3A. If the time to collision $t_{poff}$ is smaller than the first time threshold value Th1, the driving readiness degree estimation unit 15 estimates the driving readiness degree P as P1. If the time to collision $t_{poff}$ is equal to or greater than the second time threshold value Th2, the driving readiness degree estimation unit 15 estimates the driving readiness degree P as P2. If the time to collision $t_1$, is equal to or greater than the first time threshold value Th1 and smaller than the second time threshold value Th2, the driving readiness degree estimation unit 15 estimates the driving readiness degree P as a value approaching from P1 to P2 in proportion to the magnitude of the time to collision $t_{poff}$.

The driving readiness degree estimation unit 15 may estimate the driving readiness degree P as a larger value as the value of the time to collision $t_{poff}$ becomes larger. The driving readiness degree estimation unit 15 may estimate the driving readiness degree P as a larger value when the time to collision $t_{poff}$ is equal to or greater than a time threshold value set in advance compared to a case where the time to collision $t_{poff}$ is smaller than the time threshold value. The driving readiness degree estimation unit 15 may estimate the driving readiness degree P from the time to collision $t_{poff}$ using predetermined formula instead of the table data.

The driving readiness degree estimation unit 15 may estimate the driving readiness degree P using the timing at which the brake pedal is turned on instead of the timing at which the accelerator pedal is turned off. The driving readiness degree estimation unit 15 can use the time to collision when the brake pedal is on as the timing at which the brake pedal is turned on. The driving readiness degree estimation unit 15 may estimate the driving readiness degree P using the table data or the like in which the time to collision when the brake pedal is on and the driving readiness degree P are associated with each other in advance.

For example, if it is recognized that the traveling environment of vehicle M is in a state of approaching the obstacles ahead, the driving readiness degree estimation unit 15 estimates the driving readiness degree P as a larger value when the time to collision when the brake pedal is on is smaller than the TTC threshold value set in advance compared to a case when the time to collision when the brake pedal is on is equal to or greater than the TTC threshold value. The driving readiness degree estimation unit 15 may estimate the driving readiness degree P as a larger value as the time to collision when the brake pedal is on becomes larger.

In addition, the driving readiness degree estimation unit 15 may estimate the driving readiness degree P using a timing at which steering for contact avoidance is performed by the driver instead of the timing at which the accelerator pedal is turned off. For example, when the steering by the driver makes the steering angle of vehicle M become equal to or greater than a steering angle threshold value set in advance, the driving readiness degree estimation unit 15 can recognize that the steering for contact avoidance is performed by the driver. The steering torque may also be used instead of the steering angle. Out of the left and right directions, the driving readiness degree estimation unit 15 may recognize only the steering in the direction of separating the vehicle M from the obstacles as the steering for contact avoidance.

The driving readiness degree estimation unit 15 can use the time to collision (the time to collision between the vehicle M and the obstacle) when the steering for contact avoidance is performed by the driver, as the timing at which steering for contact avoidance is performed by the driver. The driving readiness degree estimation unit 15 may estimate the driving readiness degree P using the table data or the like in which the time to collision when the steering for contact avoidance is performed by the driver and the driving readiness degree P are associated with each other in advance.

For example, if it is recognized that the traveling environment of vehicle M is in a state of approaching the obstacles ahead, the driving readiness degree estimation unit 15 estimates the driving readiness degree P as a smaller value when the time to collision at the time when the steering for contact avoidance is performed by the driver is smaller than the ITC threshold value set in advance, compared to a case when the time to collision is equal to or greater than the TTC threshold value. The driving readiness degree estimation unit 15 may estimate the driving readiness degree P as a larger value as the time to collision at the time of steering for the contact avoidance becomes larger.

For the recognition of the timing, the driving readiness degree estimation unit 15 may use an inter-vehicle time (time headway (THW)) instead of the time to collision, or may use a distance between the vehicle M and the obstacle.

In addition, the driving readiness degree estimation unit 15 may estimate the driving readiness degree P when the vehicle M approaches a point of poor visibility where pedestrians may jump out from the shadows of buildings as the traveling environment of vehicle M, instead of the vehicle M approaching the obstacle. In this case also, the driving readiness degree estimation unit 15 can estimate the driving readiness degree P using the timing at which the accelerator pedal is turned off, the timing at which the brake pedal is turned on and the like described above. Instead of the point of poor visibility, a position of the temporary stop line or the like may be used, or a target point on the map set in advance may be adopted.

As the traveling environment of vehicle M, when the lane width of the traveling lane is smaller than a lane width threshold value set in advance, the driving readiness degree estimation unit 15 may estimate the driving readiness degree P as a smaller value when the accelerator operation amount by the driver becomes equal to or greater than an accelerator operation amount threshold value compare to case when the accelerator operation amount by the driver is smaller than the accelerator operation amount threshold value. If the driver excessively accelerates the vehicle M even though the lane width is narrow, assuming that the driving consciousness of the driver is low, and the driving readiness degree P can be set as a small value.

Similarly, as the traveling environment of vehicle M, when the curvature of the traveling lane is equal to or greater than the curvature threshold value set in advance, the driving readiness degree estimation unit 15 may estimate the driving readiness degree P as a smaller value when the accelerator operation amount by the driver becomes equal to or greater than the accelerator operation amount threshold value compared to a case when the accelerator operation amount by the driver is smaller than the accelerator operation amount threshold value.

If a downhill gradient of the traveling lane is equal to or greater than a gradient threshold value set in advance (when the downhill gradient angle is steep) as the traveling environment of vehicle M, the driving readiness degree estimation unit 15 may estimate the driving readiness degree P as a smaller value when the accelerator operation amount by the driver becomes equal to or greater than the accelerator operation amount threshold value compared to a case when the accelerator operation amount by the driver is smaller than the accelerator operation amount threshold value.

The driving readiness degree estimation unit 15 may use the number of traffic participants (other vehicles, pedestrians, bicycles, and the like) around the vehicle M as the traveling environment of the vehicle M. When the number of traffic participants around vehicle M is equal to or greater than the number of participants threshold value set in advance, the driving readiness degree estimation unit 15 may estimate the driving readiness degree P as a smaller value when the accelerator operation amount by the driver becomes equal to or greater than the accelerator operation amount threshold value compared to a case when the accelerator operation amount by the driver is smaller than the accelerator operation amount threshold value.

The transition time setting unit 16 sets a transition time Δt based on the driving readiness degree P estimated by the driving readiness degree estimation unit 15. The transition time Δt is a time it takes for the change in a case of changing a proportional gain described later. As the transition time Δt is shorter, the proportional gain rapidly changes. As the transition time Δt is longer, the proportional gain gradually changes.

Figure 3B:
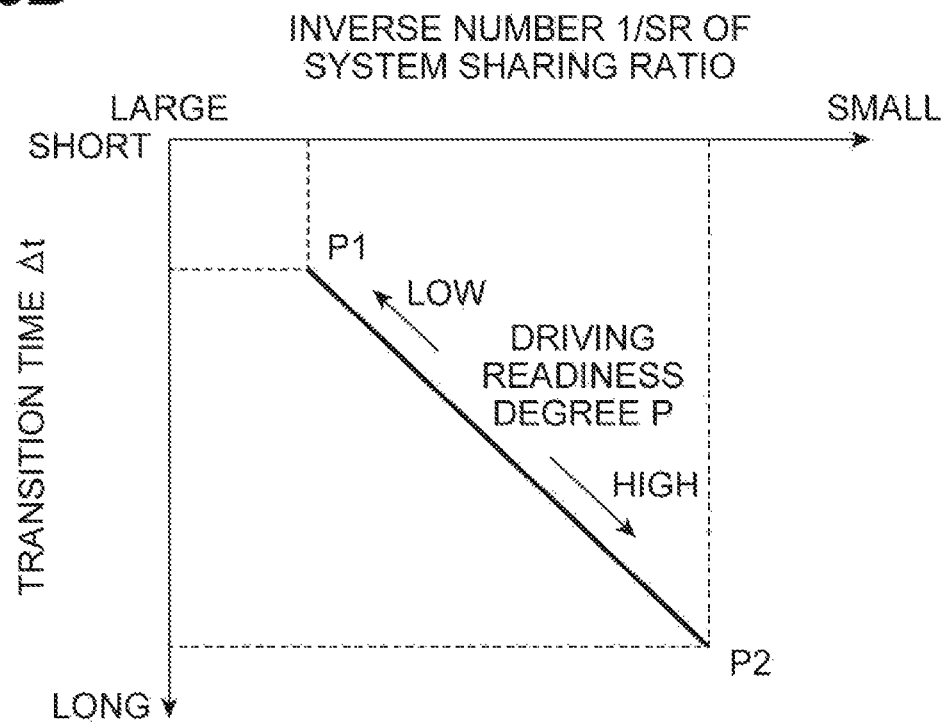
FIG. 3B is a graph illustrating an example of an association between a transition time and a system shared ratio, and a driving readiness degree.

The transition time setting unit 16 sets the transition time Δt from the driving readiness degree P using, for example, table data in which the driving readiness degree P and the transition time Δt are associated with each other in advance. FIG. 3B is a graph illustrating an example of an association between the transition time Δt and a system shared ratio SR, and the driving readiness degree P. The system shared ratio SR will be described later. The vertical axis in FIG. 3B represents the transition time Δt, and the horizontal axis represents an inverse number of the system shared ratio SR.

In a case illustrated in FIG. 3B, the transition time setting unit 16 sets the transition time Δt to a longer time as the driving readiness degree P becomes higher (closer to P1). The transition time setting unit 16 sets the transition time Δt to a shorter time as the driving readiness degree P becomes lower (closer to P2). The transition time setting unit 16 may set the transition time Δt from the driving readiness degree P using a predetermined formula instead of using the table data.

The transition time setting unit 16 may continuously change the value of the transition time Δt according to the driving readiness degree P or may change the value of the transition time Δt step by step against the driving readiness degree P. When the driving readiness degree P is lower than a threshold value for the transition time set in advance, the transition time setting unit 16 sets the transition time Δt as a shorter time compared to a case when the driving readiness degree P is equal to or higher than the threshold value for the transition time.

In addition, the transition time setting unit 16 does not need to set the transition time Δt such that the transition time Δt becomes longer as the driving readiness degree P becomes higher, in the entire range of the driving readiness degree P. The transition time setting unit 16 may set the transition time Δt in such a manner that the transition time Δt becomes longer as the driving readiness degree P becomes higher in at least a partial range of the driving readiness degree P.

The system shared ratio setting unit 17 sets the system shared ratio SR based on the driving readiness degree P. The system shared ratio SR is a shared ratio between the driver and the driving assistance system 100 regarding the traveling of the vehicle M. The concept of system shared ratio SR is derived from a percentage of assistance to a steering control by the driving assistance system 100, which means how much the driving assistance system 100 makes the actual steering angle of the vehicle M approach the target steering angle.

The system shared ratio SR is set within the range of 0 to 1 as an example. When the system shared ratio SR is 1, only the driving assistance system 100 realizes the target steering angle. This case corresponds to a state of so-called a fully autonomous driving state. When the system shared ratio SR is 0, the steering assistance by the driving assistance system 100 is not performed. This case corresponds to a so-called fully manual driving state.

If the system shared ratio SR is a value between 0 and 1, the actual steering angle of the vehicle M can be brought close to the target steering angle by both the steering by the driver and the steering assistance by the driving assistance system 100. In this case, it can be called a state of shared driving. As the system shared ratio SR approaches closer to 1, the normative teaching for the driver becomes stronger, and the driving assistance system 100 has an initiative for steering the vehicle M. As the system shared ratio SR approaches closer to 0, the normative teaching for the driver becomes weakened, and the driver has an initiative for steering the vehicle M.

Here, the derivation of the system shared ratio SR will be described briefly. The relationship between the target steering angle and the actual steering angle in an ordinary steering system in which the driver operates the steering section to control the travel of the vehicle M, can be considered. Here a linear model not considering the twisting of the steering shaft is used as the steering section of the vehicle M, and an equivalent two-wheel model is used as the vehicle model. Under this condition, the inventors found the following Equation (1) as a transfer function of the actual steering angle with respect to the target steering angle.

$$\frac{\theta s(s)}{\theta t(s)} = \frac{Kb \cdot s + Ka}{Js \cdot s^2 + (Cs + Kb)s + \left\{1 + \frac{\xi \cdot m \cdot l_r}{Ka \cdot n^2 \cdot l} \frac{V^2}{l(1 + AV^2)}\right\} Ka} \tag{1}$$

In Equation (1) described above, θt represents the target steering angle, θs represents the actual steering angle, s represents a Laplace operator, Js represents the steering system moment of inertia, Cs represents the steering system viscous damping coefficient, m represents a vehicle weight, $l_r$ represents a distance between the center of gravity and a rear wheel axis, ξ represents a steering equivalent trail, n represents a Steering gear ratio, l represents a wheel base, A represents a vehicle stability factor, and V represents a speed. In addition, Ka represents a proportional gain to be described later, and Kb represents a differential gain to be described later.

By solving above Equation (1) with the Laplace operator s as zero, following Equation (2) can be obtained.

$$\frac{\theta s(0)}{\theta t(0)} = \frac{1}{1 + \frac{\xi \cdot m \cdot l_r}{Ka \cdot n^2 \cdot l} \frac{V^2}{l(1 + AV^2)}} \tag{2}$$

In Equation (2) described above, actual steering angle θs/target steering angle θt which is the left side is called a normal gain. The normal gain can be regarded as the ratio of assistance for the driving assistance system 100 to make the actual steering angle θs approach the target steering angle θt. Here, assuming that the actual steering angle θs and the target steering angle θt coincide with each other by the assistance of the driving assistance system 100 and the normal gain becomes 1, it is considered that the remaining ratio for making the normal gain be 1 is the ratio shared by driver. Based on this way of thinking, the normal gain in Equation (2) is taken as the system shared ratio SR.

The system shared ratio setting unit 17 can set the system shared ratio SR from the driving readiness degree P using, for example, the table data in which the driving readiness degree P and the system shared ratio SR are associated with each other in advance as illustrated in FIG. 3B. The system shared ratio setting unit 17 sets the system shared ratio SR to a larger value as the driving readiness degree P becomes lower. The system shared ratio setting unit 17 sets the system shared ratio SR to a smaller value as the driving readiness degree P becomes higher.

The system shared ratio setting unit 17 may set the transition time Δt from the driving readiness degree P using a predetermined formula instead of the table data. The system shared ratio setting unit 17 may continuously change the value of the system shared ratio SR according to the driving readiness degree P, and change the value of the system shared ratio SR step by step against the driving readiness degree P. When the driving readiness degree P is lower than a threshold value for shared ratio, the transition time setting unit 16 can set the system shared ratio SR as a smaller value compared to a case when the driving readiness degree P is equal to or higher than the threshold value for shared ratio.

When setting the system shared ratio SR, the system shared ratio setting unit 17 displays an image of the system shared ratio SR by transmitting a control signal to the HMI 7. For example, the HMI 7 projects and displays the value of the system shared ratio SR on the windshield of the vehicle M. Instead of the value of the system shared ratio SR, the HMI 7 may display the SR using characters such as SR: large, SR: medium, SR: small. The HMI 7 may display the value of the system shared ratio SR using colors, or may display the value using bars or the like. The HMI 7 may notify the driver by voice when the value of the system shared ratio SR changes.

The proportional gain calculation unit 18 calculates a proportional gain Ka based on the system shared ratio SR set by the system shared ratio setting unit 17 and the speed of the vehicle M recognized by the travel state recognition unit 12. The proportional gain Ka is a coefficient used for calculating an assistance torque given to the steering section of the vehicle M as the driving assistance.

When the speed of vehicle M is constant, the proportional gain calculation unit 18 calculates the proportional gain Ka as a larger value as the system shared ratio SR becomes larger (that is, as the driving readiness degree P becomes higher). In addition, when the system shared ratio SR is constant, the proportional gain calculation unit 18 may calculate the proportional gain Ka as a larger value as the speed V becomes higher.

When the speed of vehicle M is constant, the proportional gain calculation unit 18 does not necessarily need to calculate the proportional gain Ka so as to be larger as the system shared ratio SR becomes larger in the entire range of the system shared ratio SR. The proportional gain calculation unit 18 may calculate the proportional gain Ka so as to be larger as the system shared ratio SR becomes larger in at least a partial range of the system shared ratio SR. This also applies to the relationship with the speed V.

Specifically, the proportional gain calculation unit 18 can calculate the proportional gain Ka using the following Equation (3). Equation (3) is derived by solving the above Equation (2) for Ka.

$$Ka = \frac{m \cdot l_r \cdot \xi}{n^2 \cdot l^2} \frac{1}{A + \frac{1}{V^2}} \frac{SR}{1 - SR} \tag{3}$$

In Equation (3), values except the system shared ratio SR and the speed V are fixed values determined from the vehicle specifications. The proportional gain calculation unit 18 can calculate the proportional gain Ka from the above Equation (1) based on the system shared ratio SR and the speed V.

If the system shared ratio SR is 1, the proportional gain calculation unit 18 calculates the proportional gain Ka using the following Equation (4) instead of the above Equation (3).

$$Ka = \frac{9\xi \cdot m \cdot l_r}{n^2 \cdot l} \frac{V^2}{l(1 + AV^2)} \tag{4}$$

Figure 4:
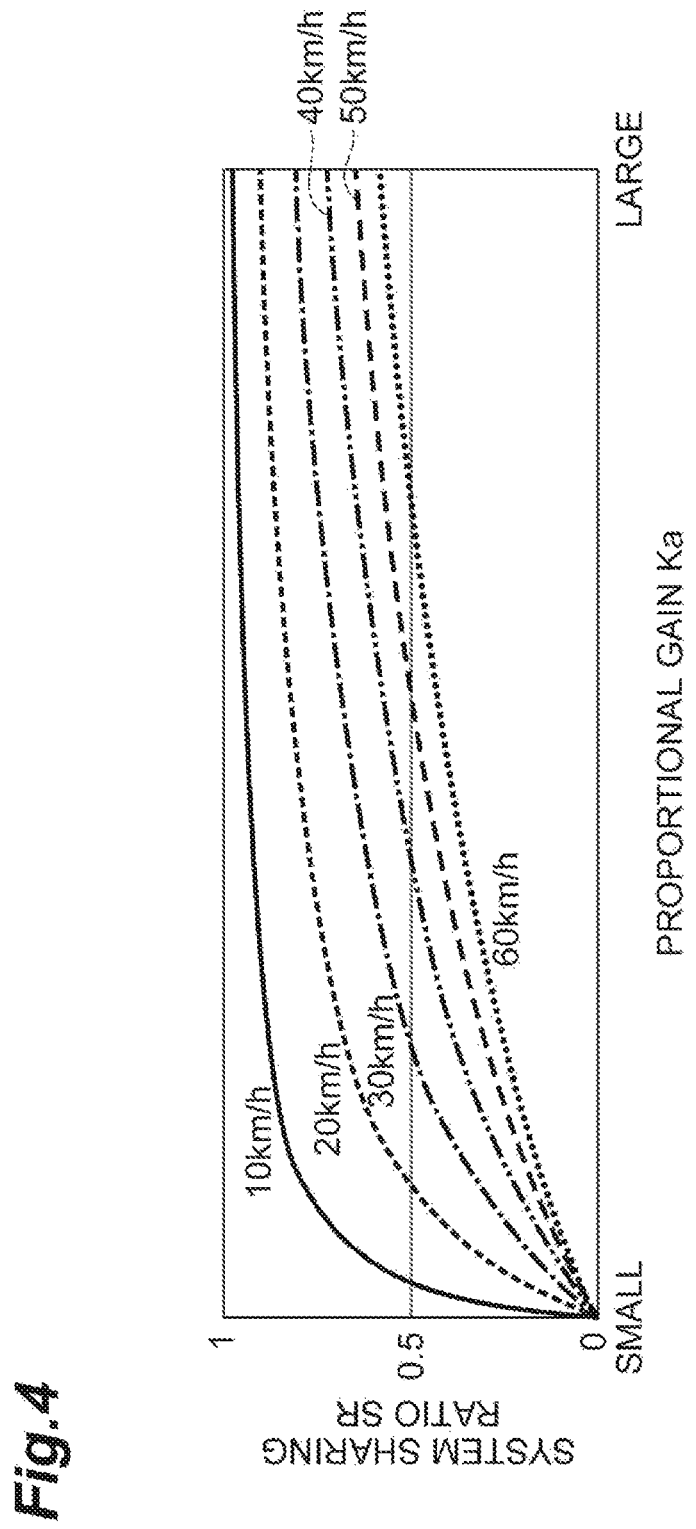
FIG. 4 is a graph illustrating an example of a relationship between the system shared ratio and a proportional gain according to a speed.
Figure 5:
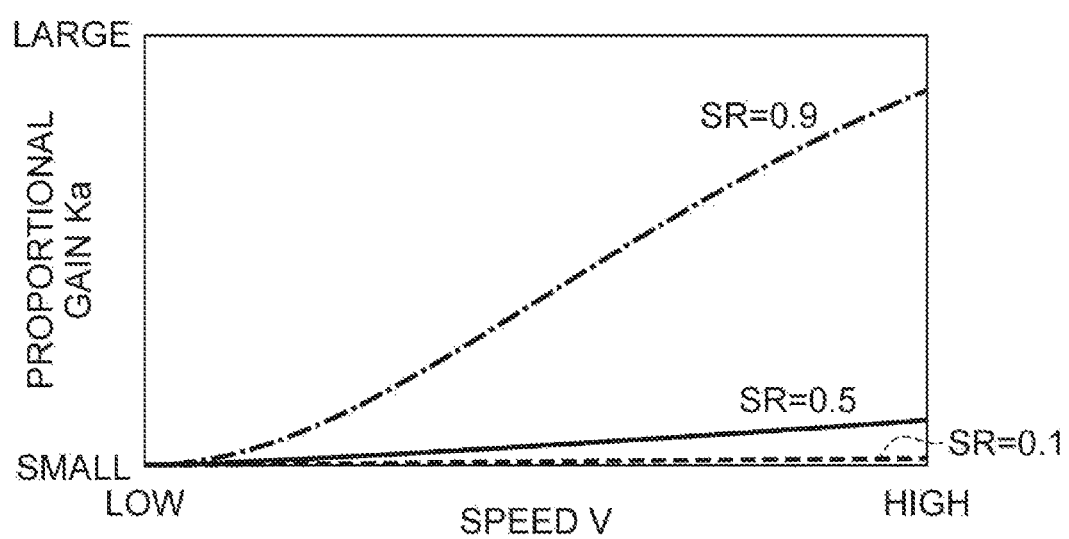
FIG. 5 is a graph illustrating an example of a relationship between the proportional gain and the speed according to the system shared ratio.

The proportional gain calculation unit 18 may calculate the proportional gain Ka from the speed V and the system shared ratio SR using the table data in which the system shared ratio SR and the proportional gain Ka according to the speed are associated with each other in advance. FIG. 4 is a graph illustrating an example of the relationship between the system shared ratio SR and the proportional gain Ka according to the speed V. In FIG. 4, the vertical axis represents the system shared ratio SR, and the horizontal axis represents the proportional gain Ka. FIG. 5 is a graph illustrating an example of the relationship between the proportional gain and the speed according to the system shared ratio. In FIG. 5, the vertical axis represents the proportional gain Ka and the horizontal axis represents the speed V.

The proportional gain calculation unit 18 can calculate the proportional gain Ka using the table data as illustrated in FIG. 4 and FIG. 5. As illustrated in FIG. 4, when the speed V is 60 km/h, the proportional gain Ka greatly increases by changing the system shared ratio SR from 0 to 0.5. On the other hand, when the speed V is 10 km/h, even if the system shared ratio SR changes from 0 to 0.5, the proportional gain Ka hardly increases. When the speed V is 10 km/h, the proportional gain Ka rapidly increases when the system shared ratio SR exceeds 0.5 and further approaches 1. In addition, as illustrated in FIG. 5, when the system shared ratio SR is 0.9, the rate of increase of the proportional gain Ka with respect to the increase of the speed V becomes large compared to a case when the system shared ratio SR is 0.1.

In addition, if the value of the proportional gain Ka calculated previously (in the previous time) is different from the value of the proportional gain Ka calculated presently (in the current time), the proportional gain calculation unit 18 changes the value (output value) of the proportional gain Ka so as to gradually reaches the value of the proportional gain Ka calculated presently from the value of the proportional gain Ka calculated in the previous time through the transition time Δt.

Figure 6A:
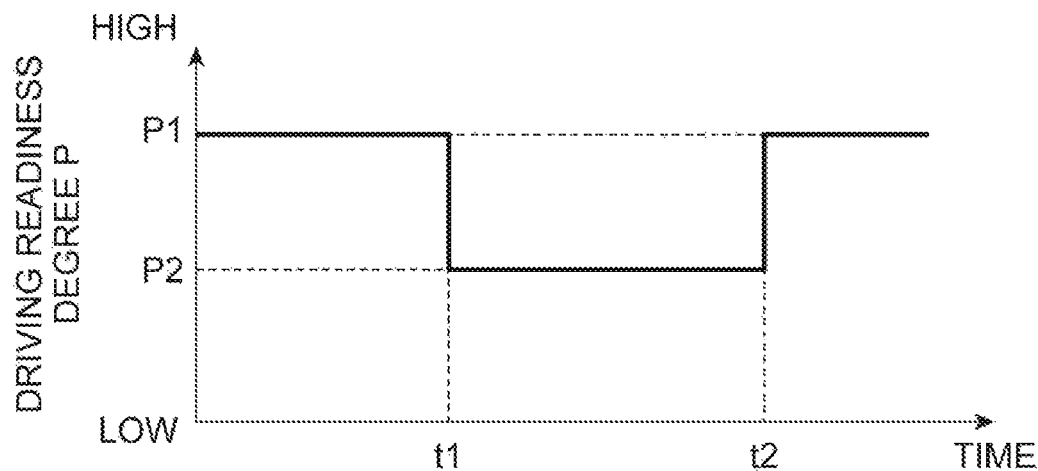
FIG. 6A is a graph illustrating an example of time-dependent change of the driving readiness degree.

Here, the changes in the proportional gain Ka will be described with reference to FIG. 6A and FIG. 6B. FIG. 6A is a graph illustrating an example of the time-dependent change of the driving readiness degree P. In FIG. 6A, the vertical axis represents the driving readiness degree P, and the horizontal axis represents the time. In FIG. 6A, the driving readiness degree P changes from a value P1 to a value P2 at the time t1. Thereafter, the driving readiness degree P returns to the value P1 from the value P2 at the time t2.

Figure 6B:
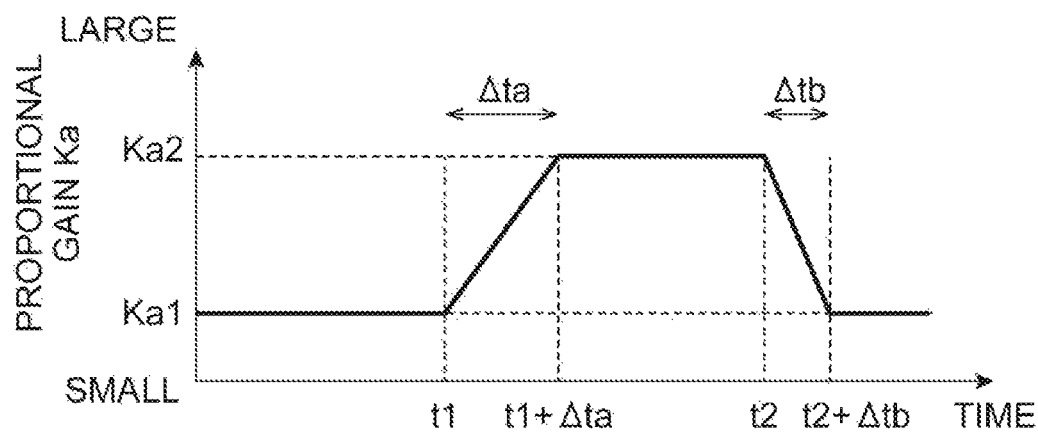
FIG. 6B is a graph illustrating an example of time-dependent change of the proportional gain.

FIG. 6B is a graph illustrating an example of the time-dependent change of the proportional gain Ka. In FIG. 6B, the vertical axis represents the proportional gain Ka, and the horizontal axis represents the time. FIG. 6B illustrates the time-dependent change of the proportional gain Ka corresponding to the time-dependent change of the driving readiness degree P in FIG. 6A.

A value Ka1 illustrated in FIG. 6B is a value of the proportional gain Ka calculated based on the value P1 of the driving readiness degree P. A value Ka2 is a value of the proportional gain Ka calculated based on the value P2 of the driving readiness degree P. The speed V of vehicle M is assumed to be constant. In addition, Δta illustrated in FIG. 6B is a value of the transition time Δt set based on the value P1 of the driving readiness degree P. Δtb illustrated is a value of the transition time Δt set based on the value P2 of the driving readiness degree P.

As illustrated in FIG. 6B, the proportional gain Ka is Ka1 at the time t1. Since the value of the driving readiness degree P has changed from P1 to P2 at the time t1, the proportional gain calculation unit 18 calculates the proportional gain Ka as Ka2 which is different from Ka1. Since the value of the driving readiness degree P has changed to P2 which is smaller than P1, the proportional gain calculation unit 18 calculates the proportional gain Ka as Ka2 which is larger than Ka1.

In this case, the proportional gain calculation unit 18 changes the value of the proportional gain Ka such that the value (output value) of the proportional gain Ka does not immediately change to Ka2 but gradually reaches Ka2 from Ka1 through the transition time Δta. The gradual change means to change the value of the proportional gain Ka with a constant change rate. The change rate is determined from the difference between Ka1 and Ka2 and the transition time Δta. The proportional gain calculation unit 18 changes the proportional gain Ka such that the value of the proportional gain Ka becomes Ka2 at the time t1+Δta which is a result of time elapse as much as the transition time Δta from the time t1.

Since the value of the driving readiness degree P has changed from P1 to P2 at the time t1, the transition time setting unit 16 sets a transition time Δtb to be used for the next change of the proportional gain Ka based on the value P2 of the new driving readiness degree P. Since the value of driving readiness degree P has changed to P2 which is a value smaller than P1, the transition time setting unit 16 newly sets the transition time Δtb which is shorter than the transition time Δta.

Thereafter, as illustrated in FIG. 6B, since the value of the driving readiness degree P has changed from P2 to P1 at the time t2, the proportional gain calculation unit 18 calculates the proportional gain Ka as Ka1 which is different from Ka2. The proportional gain calculation unit 18 gradually changes the value of the proportional gain Ka from Ka2 to Ka1 through the new transition time Δtb. The change rate is determined from the difference between Ka1 and Ka2 and the transition time Δtb.

The assistance torque calculation unit 19 calculates an assistance torque based on the actual steering angle of the vehicle M recognized by the travel state recognition unit 12, the target steering angle of the vehicle M calculated by the target steering angle calculation unit 13, and the proportional gain Ka calculated by the proportional gain calculation unit 18. The assistance torque is a torque given to the steering section of the vehicle M as the driving assistance.

Specifically, the assistance torque calculation unit 19 calculates the assistance torque according to the value obtained by multiplying the difference between the target steering angle θt and the actual steering angle θs by the proportional gain Ka. The assistance torque calculation unit 19 calculates the assistance torque using, for example, the following Equation (5). That is, the assistance torque calculation unit 19 may calculate a value obtained by multiplying the difference between the target steering angle and the actual steering angle by the proportional gain as the assistance torque. In Equation (5), the assistance torque is illustrated as Ta.

$$Ta=Ka(\theta t-\theta s) \quad (5)$$

The assistance torque calculation unit 19 transmits a control signal corresponding to the assistance torque Ta to the actuator 6, and then, confers an assistance torque Ta to the steering section of the vehicle M by driving the steering actuator. As a result, the driving assistance system 100 can realize an appropriate driving assistance by giving an appropriate assistance torque Ta corresponding to the driving readiness degree P of the driver to the steering section of the vehicle M.

Processing by Driving Assistance System in First Embodiment

Next, the processing by the driving assistance system in the first embodiment will be described with reference to the drawings. FIG. 7 is a flowchart illustrating an example of proportional gain calculation processing. The proportional gain calculation processing is performed when the driving assistance of vehicle M is permitted.

Proportional Gain Calculation Processing

As illustrated in FIG. 7, as S10, the ECU 10 of the driving assistance system 100 recognizes the driving operation by the driver using the driving operation recognition unit 14. The driving operation recognition unit 14 recognizes the driving operation by the driver detected by the driving operation detection unit 4. Thereafter, the ECU 10 makes the process proceed to S12.

In S12, the ECU 10 recognizes the traveling environment of the vehicle M using the traveling environment recognition unit 11. The traveling environment recognition unit 11 recognizes the traveling environment of the vehicle M based on the result of detection performed by the external sensor 2. Thereafter, the ECU 10 makes the process proceed to S14.

In S14, the ECU 10 estimates the driving readiness degree P of the driver using the driving readiness degree estimation unit 15. The driving readiness degree estimation unit 15 estimates the driving readiness degree P based on the driving operation by the driver and the traveling environment of the vehicle M. For example, if the traveling environment of vehicle M is in a state of approaching an obstacle ahead, the driving readiness degree estimation unit 15 estimates the driving readiness degree P from the time to collision when the driver turns off the accelerator pedal. Thereafter, the ECU 10 makes the process proceed to S16.

In S16, the ECU 10 sets the system shared ratio SR using the system shared ratio setting unit 17. The system shared ratio setting unit 17 sets the system shared ratio SR based on the driving readiness degree P. The system shared ratio setting unit 17 sets the system shared ratio SR as a larger value as the driving readiness degree P becomes higher. Thereafter, the ECU 10 makes the process proceed to S18.

In S18, the ECU 10 calculates the proportional gain Ka using the proportional gain calculation unit 18. The proportional gain calculation unit 18 calculates the proportional gain Ka based on the system shared ratio SR and the speed V of the vehicle M. When the speed V is constant, the proportional gain calculation unit 18 calculates the proportional gain Ka as a larger value as the system shared ratio SR becomes larger. When the system shared ratio SR is constant, the proportional gain calculation unit 18 calculates the proportional gain Ka as a larger value as the speed V becomes higher. Thereafter, the ECU 10 makes the process proceed to S20.

In S20, the ECU 10 sets the transition time using the transition time setting unit 16. The transition time setting unit 16 sets the transition time Δt based on the driving readiness degree P. Thereafter, the ECU 10 ends the proportional gain calculation processing. The ECU 10 repeats the processing from S10 again after a certain time elapsed, for example. The ECU 10 may repeat the processing from S10 when the traveling environment of the vehicle M changes or when the driving operation by the driver is input or changed. When the system shared ratio SR is 0, the processing in S18 and S20 do not necessarily need to be performed.

Proportional Gain Change Processing

FIG. 8A is a flowchart illustrating an example of proportional gain change processing. The proportional gain change processing is performed when the proportional gain Ka is calculated in S18 in FIG. 7.

As illustrated in FIG. 8A, as S30, the ECU 10 determines whether or not the value of the proportional gain Ka calculated previously by the proportional gain calculation unit 18 is different from the value of the proportional gain Ka calculated presently. If it is determined that the value of the proportional gain Ka calculated previously is different from the value of the proportional gain Ka calculated presently (YES in S30), the ECU 10 makes the process proceed to S32. If it is not determined that the value of the proportional gain Ka calculated previously is different from the value of the proportional gain Ka calculated presently (NO in S30), the ECU 10 the ECU 10 ends the current processing because there is no need to change the value of the proportional gain Ka.

In S32, the ECU 10 gradually changes the proportional gain Ka using the proportional gain calculation unit 18 through the transition time Δt. The proportional gain calculation unit 18 changes the value (output value) of the proportional gain Ka so as to gradually reach the value of the proportional gain Ka calculated presently from the value of the proportional gain Ka calculated previously through the transition time Δt. When the processing in S32 is completed (when the transition time Δt has elapsed and the value of the proportional gain Ka has reached the value calculated presently), the ECU 10 ends the proportional gain change processing.

Assistance Torque Calculation Processing

FIG. 8B is a flowchart illustrating an example of assistance torque calculation processing. The assistance torque calculation processing is performed when the driving assistance is permitted. The assistance torque calculation processing may be performed when the driving assistance is permitted and the system shared ratio SR is other than 0.

As illustrated in FIG. 8B, as S40, the ECU 10 recognizes the traveling environment of the vehicle M using the traveling environment recognition unit 11. The traveling environment recognition unit 11 recognizes the traveling environment of the vehicle M based on the result of detection performed by the external sensor 2. Thereafter, the ECU 10 makes the process proceed to S42.

In S42, the ECU 10 calculates the target steering angle of the vehicle M using the target steering angle calculation unit 13. The target steering angle calculation unit 13 calculates the target steering angle based on the traveling environment of the vehicle M recognized by the traveling environment recognition unit 11. The target steering angle calculation unit 13 may further calculate the target steering angle based on the travel state of the vehicle M. Thereafter, the ECU 10 makes the process proceed to S44.

In S44, the ECU 10 recognizes the actual steering angle of the vehicle M using the travel state recognition unit 12. The travel state recognition unit 12 recognizes the actual steering angle of the vehicle M based on the result of measurement performed by the steering sensor. Thereafter, the ECU 10 makes the process proceed to S46.

In S46, the ECU 10 calculates the assistance torque Ta using the assistance torque calculation unit 19. The assistance torque calculation unit 19 calculates an assistance torque according to a value obtained by multiplying the difference between the target steering angle and the actual steering angle by the proportional gain. Thereafter, the ECU 10 ends the current assistance torque calculation processing. When the driving assistance is permitted, the ECU 10 repeats the processing from S40 again after a certain time elapsed.

Operational Effects of Driving Assistance System according to the First Embodiment According to the driving assistance system 100 in the first embodiment described above, since the driving readiness degree P relating to the driving consciousness of the driver is estimated based on the driving operation by the driver of the vehicle M and the traveling environment of the vehicle M, it is possible to appropriately estimate the driving readiness degree P of the driver from the driving operation by the driver according to the traveling environment compared to a case where the driving readiness degree P is estimated only from the travel state of vehicle M or only from the driving operation by the driver. In addition, in the driving assistance system 100, when the speed V is constant, the proportional gain Ka is calculated as a smaller value as the driving readiness degree P becomes lower, and the assistance torque Ta is calculated according to the value obtained by multiplying the difference between target steering angle θt and actual steering angle θs by the proportional gain Ka. Therefore, it is possible to perform the driving assistance by the assistance torque Ta using the appropriately estimated driving readiness degree P.

Furthermore, in the driving assistance system 100, the transition time Δt is set to be shorter as the driving readiness degree P becomes lower. Therefore, for the driver whose driving readiness degree P is decreased, the proportional gain Ka can be changed in a short time, and thus, it is possible to perform the driving assistance by the appropriate assistance torque Ta according to the driving readiness degree P.

Second Embodiment

Figure 9:
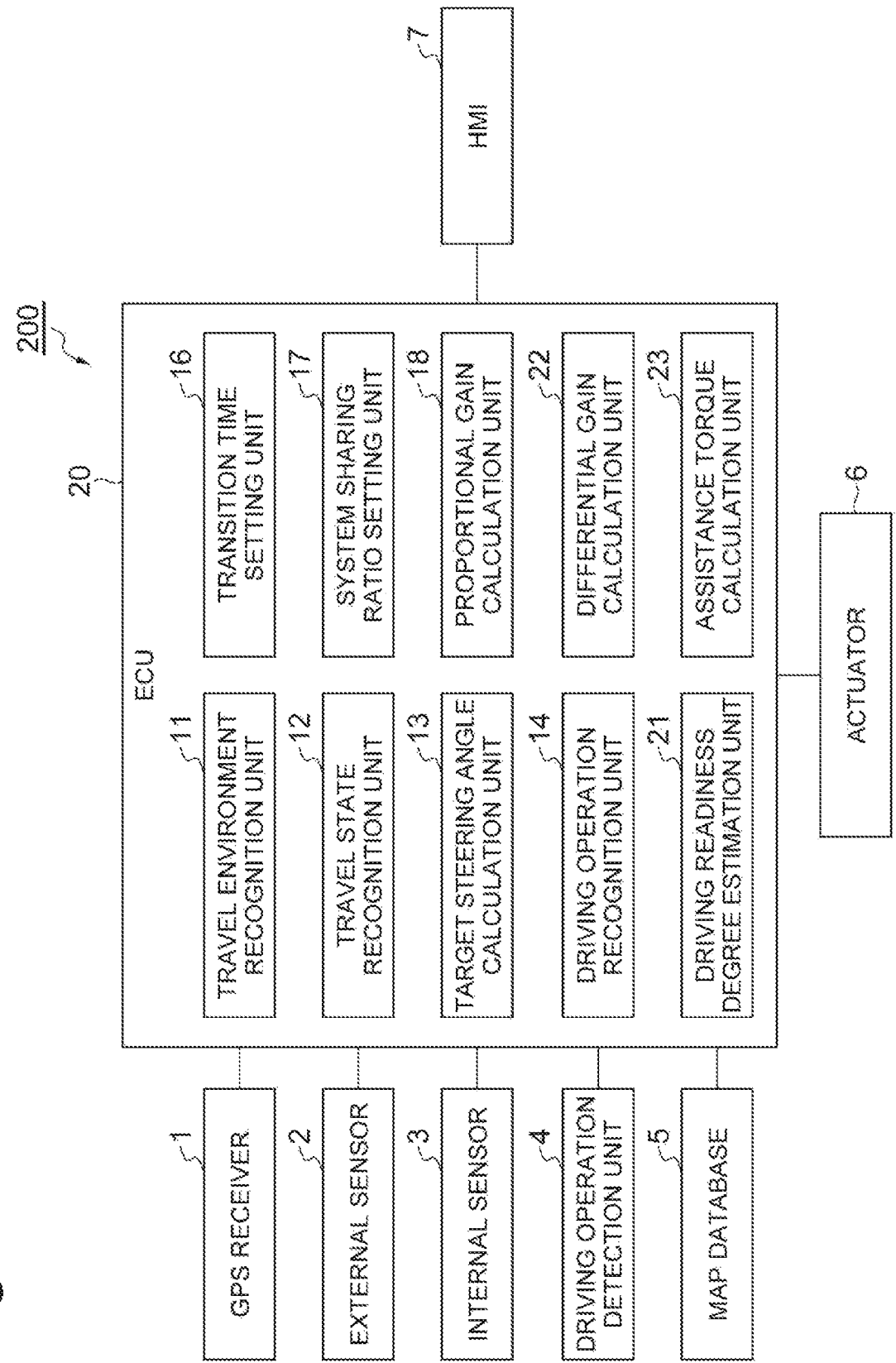
FIG. 9 is a block diagram illustrating a driving assistance system in a second embodiment.

Next, a driving assistance system according to a second embodiment will be described. FIG. 9 is a block diagram illustrating a driving assistance system 200 according to the second embodiment. The driving assistance system 200 illustrated in FIG. 9 differs from the first embodiment mainly in the points that the method of estimating the driving readiness degree P is different and a differential gain Kb is used for the calculation of the assistance torque. The same reference numerals are given to the same components as those of the first embodiment, and the descriptions thereof will not be repeated.

Configuration of Driving Assistance System in Second Embodiment

As illustrated in FIG. 9, in an ECU 20 of the driving assistance system 200 according to the second embodiment, functions of a driving readiness degree estimation unit 21 and an assistance torque calculation unit 23 are different from those in the ECU 10 in the first embodiment. In addition, the ECU 20 further includes a differential gain calculation unit 22.

The driving readiness degree estimation unit 21 estimates the driving readiness degree P using the travel state of the vehicle M instead of the driving operation by the driver in the first embodiment. The driving readiness degree estimation unit 21 estimates the driving readiness degree P based on the travel state of the vehicle M recognized by the travel state recognition unit 12 and the traveling environment of the vehicle M.

For example, if the vehicle M is approaching an obstacle ahead as the traveling environment of vehicle M, the driving readiness degree estimation unit 21 estimates the driving readiness degree P based on the deceleration timing of the vehicle M. The deceleration timing of the vehicle M can be recognized as a time to collision between the vehicle M and the obstacle when the deceleration of the vehicle M becomes equal to or greater than a deceleration threshold value set in advance. The driving readiness degree estimation unit 21 estimates the driving readiness degree P as a smaller value as the time to collision when the deceleration of the vehicle M becomes equal to or greater than the deceleration threshold value becomes smaller.

The driving readiness degree estimation unit 21 may recognize a steering avoidance timing of the vehicle M instead of the deceleration timing of the vehicle M. For example, the steering avoidance timing of the vehicle M is recognized as a time to collision between the vehicle M and the obstacle when the yaw rate of the vehicle M becomes equal to or greater than a yaw rate threshold value set in advance. If the vehicle M is approaching the obstacle ahead as the traveling environment of the vehicle M, the driving readiness degree estimation unit 21 estimates the driving readiness degree P as a smaller value as the time to collision when the yaw rate of the vehicle M becomes equal to or larger than the yaw rate threshold value becomes smaller. The driving readiness degree estimation unit 21 may use a vehicle-to-vehicle time or a distance between the vehicle M and the obstacle instead of the time to collision.

If the vehicle M is approaching the obstacle ahead as the traveling environment of the vehicle M, the driving readiness degree estimation unit 21 may estimate the driving readiness degree P based on the speed V of the vehicle M when the distance between the vehicle M and obstacle becomes a set distance. The set distance is a distance set in advance (for example, 20 m). The set distance may be set as a longer distance as the speed V becomes higher.

If the driving consciousness of the driver is high, since it can be considered that the speed V of the vehicle M that approaches the obstacle as close as the set distance becomes equal to or lower than a certain value, the driving readiness degree estimation unit 21 estimates the driving readiness degree P based on the speed V. When the speed V is equal to or higher than a certain value, the driving readiness degree estimation unit 21 estimates the driving readiness degree P as a lower value compared to a case when the speed V is lower than a certain value. The driving readiness degree estimation unit 21 may use the acceleration of the vehicle M (the deceleration) instead of the speed V.

The driving readiness degree estimation unit 21 may estimate the driving readiness degree P when the vehicle M approaches a point of poor visibility where pedestrians may jump out from the shadows of buildings as the traveling environment of vehicle M, instead of the vehicle M approaching the obstacle.

If the lane width of the traveling lane is narrower than a lane width threshold value set in advance as the traveling environment of vehicle M, the driving readiness degree estimation unit 21 may estimate the driving readiness degree P as a smaller value when the acceleration of the vehicle M becomes equal to or greater than an acceleration threshold value set in advance compared a case when the acceleration of the vehicle M becomes is smaller than the acceleration threshold value. Similarly, if the curvature of the traveling lane is equal to or greater than a curvature threshold value set in advance as the traveling environment of vehicle M, the driving readiness degree estimation unit 21 may estimate the driving readiness degree P as a smaller value when the acceleration of the vehicle M becomes equal to or greater than the acceleration threshold value compared to a case when the acceleration of the vehicle M is less than the acceleration threshold value.

If a downhill gradient of the traveling lane is equal to or greater than a gradient threshold value set in advance (when the downhill gradient angle is steep) as the traveling environment of vehicle M, the driving readiness degree estimation unit 21 may estimate the driving readiness degree P as a smaller value when the acceleration of the vehicle M becomes equal to or greater than the acceleration threshold value compared to a case when the acceleration of the vehicle M is smaller than the acceleration threshold value.

The driving readiness degree estimation unit 21 may use the number of traffic participants (other vehicles, pedestrians, bicycles, and the like) around the vehicle M as the traveling environment of the vehicle M. When the number of traffic participants around vehicle M is equal to or greater than the number of participants threshold value set in advance, the driving readiness degree estimation unit 21 may estimate the driving readiness degree P as a smaller value when the acceleration of the vehicle M becomes equal to or greater than the acceleration threshold value set in advance compared to a case when the acceleration of the vehicle M is smaller than the acceleration threshold value.

The differential gain calculation unit 22 calculates a differential gain Kb based on the system shared ratio SR set by the system shared ratio setting unit 17 and the proportional gain Ka calculated by the proportional gain calculation unit 18. The differential gain Kb is one of the coefficients used for calculating the assistance torque Ta given to the steering section of the vehicle M as the driving assistance.

The differential gain calculation unit 22 calculates the differential gain Kb from the system shared ratio SR and the proportional gain Ka using, for example, following Equation (6).

$$Kb = 2\sqrt{\frac{Js \cdot Ka}{SR}} - Cs \qquad (6)$$

If the system shared ratio SR or the speed V is zero, the differential gain calculation unit 22 calculates the differential gain Kb as 0.

The differential gain calculation unit 22 may calculate the differential gain Kb from the system shared ratio SR and the proportional gain Ka using the table data in which the system shared ratio SR and the proportional gain Ka are associated with the differential gain Kb in advance.

Figure 10:
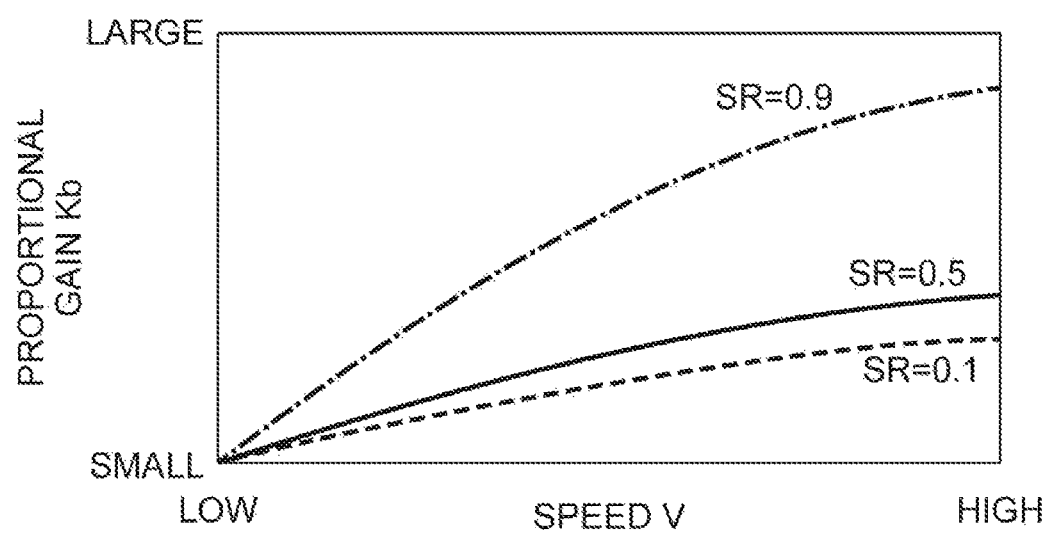
FIG. 10 is a graph illustrating an example of a relationship between differential gain and the speed.

FIG. 10 is a graph illustrating an example of a relationship between the differential gain Kb and the speed V according to the system shared ratio SR. The differential gain calculation unit 22 can calculate the differential gain Kb using the relationship table data illustrated in FIG. 10. As illustrated in FIG. 10, when the system shared ratio SR is 0.9, the differential gain calculation unit 22 can calculate the differential gain Kb such that an amount of increase of the differential gain Kb becomes larger as the speed V increases, compared to a case when the system shared ratio SR is 0.1.

The differential gain calculation unit 22 does not need to calculate the differential gain Kb such that the differential gain Kb becomes a smaller value as the driving readiness degree P becomes smaller, in the whole range of the driving readiness degree P. The differential gain calculation unit 22 may calculate the differential gain Kb in such a manner that the smaller the differential gain Kb becomes smaller as the driving readiness degree P becomes lower in at least a partial range of the driving readiness degree P.

If the value of the differential gain Kb calculated previously is different from the value of the differential gain Kb calculated presently, the differential gain calculation unit 22 changes the value (output value) of the differential gain Kb so as to gradually reaches the value of the differential gain Kb calculated presently from the value of the differential gain Kb calculated previously through the transition time Δt. The gradual change by the differential gain calculation unit 22 means to change the value of the differential gain Kb with a constant change rate. The change rate is determined from the difference between the value of the differential gain Kb calculated previously and the value of the differential gain Kb calculated presently, and the transition time Δt. The differential gain calculation unit 22 can change the value of the differential gain Kb in the same way as the proportional gain change processing illustrated in FIG. 8B.

The assistance torque calculation unit 23 calculates an assistance torque Ta based on the actual steering angle of the vehicle M recognized by the travel state recognition unit 12, the target steering angle of the vehicle M calculated by the target steering angle calculation unit 13, the proportional gain Ka calculated by the proportional gain calculation unit 18, and the differential gain Kb calculated by the differential gain calculation unit 22.

Specifically, the assistance torque calculation unit 23 calculates the assistance torque Ta according to a total value obtained by adding a value obtained by multiplying the difference between the target steering angle θt and the actual steering angle θs by the proportional gain Ka, to a value obtained by multiplying the difference between the differential value of the target steering angle θt and the differential value of the actual steering angle θs by the differential gain Kb. The assistance torque calculation unit 23 calculates the assistance torque using, for example, following Equation (7). That is, the assistance torque calculation unit 23 may calculate the above-described total value as the assistance torque Ta.

$$Ta = Ka(\theta t - \theta s) + Kb(\dot{\theta} t - \dot{\theta} s) \quad (7)$$

The assistance torque calculation unit 23 transmits a control signal corresponding to the assistance torque Ta to the actuator 6, and then, confers an assistance torque Ta to the steering section of the vehicle M by driving the steering actuator. In this way, by calculating the assistance torque Ta by adding the differential gain Kb, it is possible to improve the responsiveness of the actual steering angle θs to the change of the target steering angle θt. Such improvement in the responsiveness can be confirmed by evaluating the response to the step input to the above-described Equation (1).

Processing by Driving Assistance System in Second Embodiment

Figure 11:
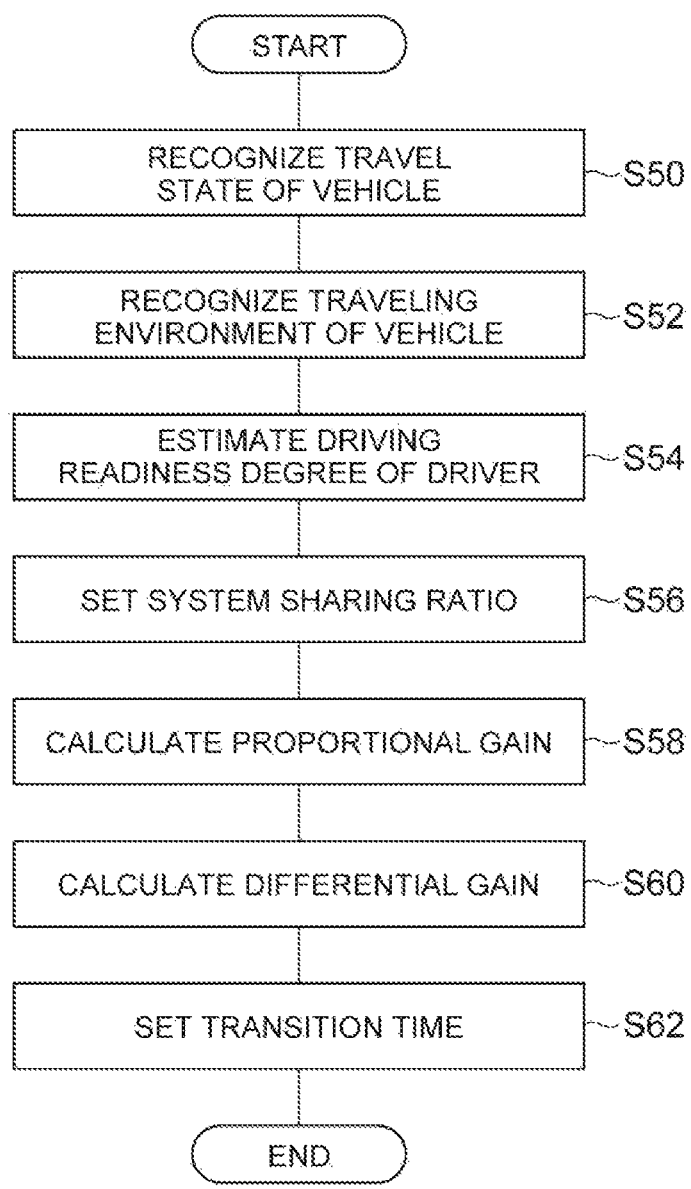
FIG. 11 is a flowchart illustrating an example of proportional gain calculation processing and differential gain calculation processing.

Subsequently, the processing by the driving assistance system 200 in the second embodiment will be described. FIG. 11 is a flowchart illustrating an example of the proportional gain and the differential gain calculation processing. The calculation processing is performed when the driving assistance of vehicle M is permitted. The processing in S52, S56, S58, and S62 illustrated in FIG. 11 is the same as the processing in S12, S16, S18, S20 illustrated in FIG. 7 in the first embodiment.

Proportional Gain and Differential Gain Calculation Processing

As illustrated in FIG. 11, as S50, the ECU 20 of the driving assistance system 200 recognizes the travel state of the vehicle M using the travel state recognition unit 12. The travel state recognition unit 12 recognizes the travel state of the vehicle M based on the result of detection performed by the internal sensor 3 and the like. Thereafter, the ECU 20 makes the process proceed to S52.

In S52, the ECU 20 recognizes the traveling environment of the vehicle M using the traveling environment recognition unit 11. The traveling environment recognition unit 11 recognizes the traveling environment of the vehicle M based on the result of detection performed by the external sensor 2. Thereafter, the ECU 20 makes the process proceed to S54.

In S54, the ECU 20 estimates the driving readiness degree P of the driver using the driving readiness degree estimation unit 21. The driving readiness degree estimation unit 21 estimates the driving readiness degree P based on the travel state of the vehicle M and the traveling environment of the vehicle M. For example, if the traveling environment of vehicle M is in state of approaching the obstacle, the driving readiness degree estimation unit 21 estimates the driving readiness degree P based on the speed V of the vehicle M when the distance between the vehicle M and the obstacle becomes the set distance. Thereafter, the ECU 20 makes the process proceed to S56.

In S56, the ECU 20 sets the system shared ratio SR using the system shared ratio setting unit 17. The system shared ratio setting unit 17 sets the system shared ratio SR based on the driving readiness degree P. The system shared ratio setting unit 17 sets the system shared ratio SR as a larger value as the driving readiness degree P becomes higher. Thereafter, the ECU 20 makes the process proceed to S58.

In S58, the ECU 20 calculates the proportional gain Ka using the proportional gain calculation unit 18. The proportional gain calculation unit 18 calculates the proportional gain Ka based on the system shared ratio SR and the speed V of the vehicle M. Thereafter, the ECU 20 makes the process proceed to S60.

In S60, the ECU 20 calculates the differential gain Kb using the differential gain calculation unit 22. The differential gain calculation unit 22 calculates the differential gain Kb based on the system shared ratio SR and the proportional gain Ka. Thereafter, the ECU 20 makes the process proceed to S62.

In S62, the ECU 20 sets the transition time using the transition time setting unit 16. The transition time setting unit 16 sets the transition time Δt based on the driving readiness degree P. Thereafter, the ECU 20 ends the current calculation processing. The ECU 20 repeats the processing from S50 again after a certain time elapsed, for example. The ECU 20 may repeat the processing from S50 when the traveling environment of the vehicle M changes or when the driving operation by the driver is input or changed. When the system shared ratio SR is 0, the processing in S58, S60, and S62 do not necessarily need to be performed.

Assistance Torque Calculation Processing

Figure 12:
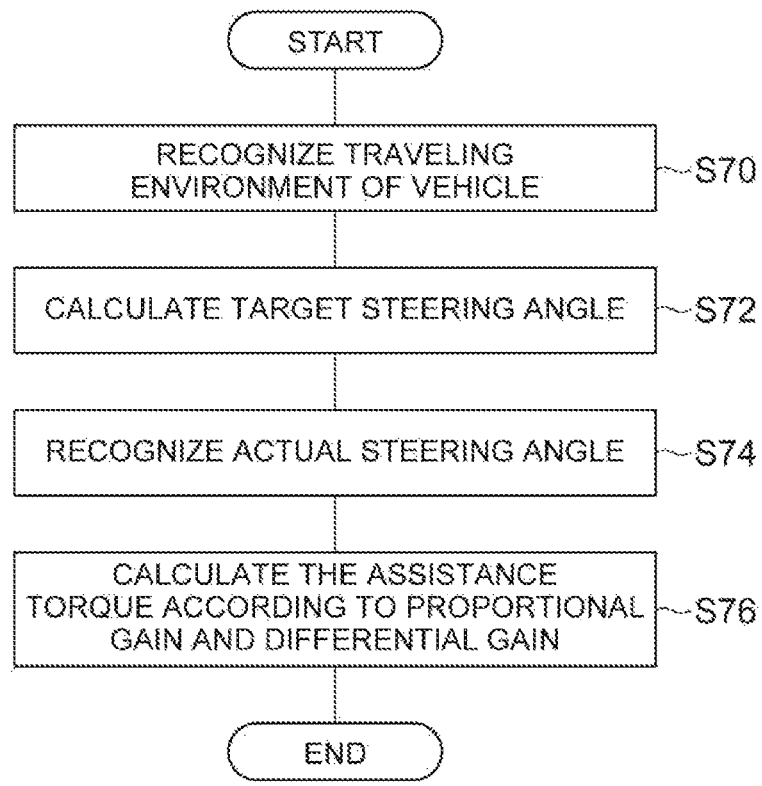
FIG. 12 is a flowchart illustrating an example of assistance torque calculation processing in the second embodiment.

FIG. 12 is a flowchart illustrating an example of assistance torque calculation processing in the second embodiment. The assistance torque calculation processing is performed when the driving assistance is permitted. The assistance torque calculation processing may be performed when the driving assistance is permitted and the system shared ratio SR is other than 0. The processing in S70 to S74 illustrated in FIG. 12 is the same as the processing in S40 to S44 illustrated in FIG. 8B in the first embodiment, and the description thereof will not be repeated.

As illustrated in FIG. 12, in S76, the ECU 20 calculates the assistance torque Ta using the assistance torque calculation unit 23. The assistance torque calculation unit 23 calculates the assistance torque Ta according to a total value obtained by adding a value obtained by multiplying the difference between the target steering angle θt and the actual steering angle θs by the proportional gain Ka, to a value obtained by multiplying the difference between the differential value of the target steering angle θt and the differential value of the actual steering angle θs by the differential gain Kb. The assistance torque calculation unit 23 can calculate the assistance torque Ta using the above Equation (7).

Operational Effects of Driving Assistance System According to the Second Embodiment According to the driving assistance system 200 in the second embodiment described above, since the driving readiness degree P relating to the driving consciousness of the driver is estimated based on the travel state of the vehicle M and the traveling environment of the vehicle M, it is possible to appropriately estimate the driving readiness degree P of the driver from the travel state according to the traveling environment of the vehicle M compared to a case where the driving readiness degree P is estimated only from the travel state of vehicle M or only from the driving operation by the driver.

In addition, according to the driving assistance system 200, the assistance torque Ta is calculated according to the total value obtained by adding a value obtained by multiplying the difference between the target steering angle θt and the actual steering angle θs by the proportional gain Ka, to a value obtained by multiplying the difference between the differential value of the target steering angle θt and the differential value of the actual steering angle θs by the differential gain Kb. Therefore, it is possible to improve the responsiveness of the assistance torque Ta to the change of the target steering angle θt. In addition, in the driving assistance system 200, since the differential gain Kb is calculated based on the driving readiness degree P, it is possible to obtain the appropriate assistance torque Ta according to the state of the driver compared to a case where the differential gain Kb is determined irrespective of the driving readiness degree P.

The preferred embodiments of the present disclosure have been described above, the present disclosure is not limited to the above-described embodiments. The present disclosure can be implemented in various forms including various modifications and improvements based on the knowledge of those skilled in the art, including the above-described embodiments.

For example, the driving assistance systems 100 and 200 do not necessarily need to include a system shared ratio setting unit 17. The proportional gain calculation unit 18 may calculate the proportional gain Ka based on the driving readiness degree P and the speed V without going through the system shared ratio SR. In this case, if the speed V is constant, the proportional gain calculation unit 18 calculates the proportional gain Ka as a smaller value as the driving readiness degree P becomes lower. The proportional gain calculation unit 18 may calculate the proportional gain Ka from the driving readiness degree P and the speed V using the table data in which the driving readiness degree P and the speed V are associated with the proportional gain Ka. The proportional gain calculation unit 18 may calculate the proportional gain Ka from the driving readiness degree P and the speed V according to a predetermined formula.

If the speed V is constant, the proportional gain calculation unit 18 does not need to calculate the proportional gain Ka as a larger value as the driving readiness degree P becomes lower in the entire range of the driving readiness degree P, but calculate the proportional gain Ka as a larger value as the driving readiness degree P becomes lower in at least a partial range of the driving readiness degree P.

The driving assistance system 100 and 200 do not necessarily need to include the transition time setting unit 16. The transition time Δt may be a fixed value. In addition, if the value of the proportional gain Ka calculated previously is different from the value of the proportional gain Ka calculated presently, the proportional gain calculation unit 18 may not gradually change the value (output value) of the proportional gain Ka through the time, but may immediately change the value to the value of the proportional gain Ka calculated presently.

Similarly, if the value of the differential gain Kb calculated previously is different from the value of the differential gain Kb calculated presently, the differential gain calculation unit 22 may not gradually change the value (output value) of the differential gain Kb through the time, but may immediately change the value to the value of the differential gain Kb calculated presently. In addition, only one of the proportional gain Ka and the differential gain Kb may gradually change through the transition time Δt.

The driving readiness degree estimation unit 15 in the first embodiment may estimate the driving readiness degree P based on the travel state of the vehicle M and the traveling environment of the vehicle M like the driving readiness degree estimation unit 21 in the second embodiment. Similarly, the driving readiness degree estimation unit 21 in the second embodiment may estimate the driving readiness degree P based on the driving operation by the driver and the traveling environment of the vehicle M like the driving readiness degree estimation unit 15 in the first embodiment.

The assistance torque calculation unit 19 may calculate the assistance torque Ta by multiplying the above Equation (5) by any coefficient, or may calculate the assistance torque Ta by adding or subtracting any constant. Similarly, the assistance torque calculation unit 23 may calculate the assistance torque Ta by multiplying the above Equation (7) by any coefficient, or may calculate the assistance torque Ta by adding or subtracting any constant.

What is claimed is:

1. A driving assistance system that is configured to calculate a target steering angle of a vehicle based on a traveling environment of the vehicle and confer an assistance torque to a steering section, in accordance with a difference between the target steering angle and an actual steering angle of the vehicle so that the actual steering angle of the vehicle approaches the target steering angle, the system comprising:

an electronic control unit (ECU) programmed to:
recognize a travel state including a speed of the vehicle;
recognize a driving operation of the vehicle by a driver;
recognize a traveling environment of the vehicle;

estimate a driving readiness degree relating to a driving consciousness of the driver based on the travel state of the vehicle or the driving operation of the vehicle by the driver and the traveling environment of the vehicle;

calculate a proportional gain based on the driving readiness degree and the speed of the vehicle;

calculate the assistance torque according to a value obtained by multiplying a difference between the target steering angle and the actual steering angle by the proportional gain; and transmit a control signal, which corresponds to the calculated assistance torque, to an actuator for performing the driving assistance, wherein, based upon the speed being constant, calculate the proportional gain as a smaller value as the driving readiness degree becomes lower.

2. The driving assistance system according to claim 1, wherein the ECU is further programmed to:

set a transition time based on the driving readiness degree, wherein if a value of the proportional gain calculated previously is different from a value of the proportional gain calculated presently, change the proportional gain so as to gradually reach the value of the proportional gain calculated presently from the value of the proportional gain calculated previously through the transition time, and set the transition time as a shorter time as the driving readiness degree becomes lower.

3. The driving assistance system according to claim 2, wherein the ECU is further programmed to:

calculate a differential gain based on the driving readiness degree and the proportional gain, calculate the assistance torque according to a total value obtained by adding a value obtained by multiplying a difference between the target steering angle and the actual steering angle by the proportional gain, to a value obtained by multiplying a difference between the differential value of the target steering angle and the differential value of the actual steering angle by the differential gain, and calculate the differential gain as a smaller value as the driving readiness degree becomes lower.

4. The driving assistance system according to claim 1, wherein the ECU is further programmed to:

calculate a differential gain based on the driving readiness degree and the proportional gain, calculate the assistance torque according to a total value obtained by adding a value obtained by multiplying a difference between the target steering angle and the actual steering angle by the proportional gain, to a value obtained by multiplying a difference between a differential value of the target steering angle and a differential value of the actual steering angle by the differential gain, and calculate the differential gain as a smaller value as the driving readiness degree becomes lower.

* * * * *